United States Patent [19]
Kobayashi

[11] Patent Number: 5,224,698
[45] Date of Patent: Jul. 6, 1993

[54] APPARATUS FOR FEEDING SHEET-LIKE OBJECT

[75] Inventor: Koichi Kobayashi, Yokohama, Japan

[73] Assignee: Kabushiki Kaisha Toshiba, Kawasaki, Japan

[21] Appl. No.: 838,947

[22] Filed: Feb. 21, 1992

[30] Foreign Application Priority Data

Feb. 22, 1991 [JP] Japan .................. 3-028355
Sep. 9, 1991 [JP] Japan .................. 3-227655

[51] Int. Cl.$^5$ ............................................ B65H 5/34
[52] U.S. Cl. ..................... 271/270; 271/114
[58] Field of Search .............. 271/114, 266, 270, 314

[56] References Cited

U.S. PATENT DOCUMENTS

| | | | |
|---|---|---|---|
| 2,084,783 | 6/1937 | Seybold | 271/270 |
| 3,201,115 | 8/1965 | Kury | 271/270 |
| 3,368,414 | 2/1968 | Scholin et al. | |
| 3,731,915 | 5/1973 | Guenther | 271/114 |
| 3,908,982 | 9/1975 | Abe | 271/114 |
| 4,345,752 | 8/1982 | Nakamura et al. | |
| 4,529,188 | 7/1985 | Sturnick | 271/114 |
| 4,589,646 | 5/1986 | Ozawa et al. | 271/114 |
| 4,600,929 | 7/1986 | Cardona et al. | 271/114 |
| 4,653,742 | 3/1987 | Sasaki et al. | 271/114 |
| 5,160,128 | 11/1992 | Oishi | 271/114 |

FOREIGN PATENT DOCUMENTS 0256795 2/1988 European Pat. Off. .
215437 9/1987 Japan .................. 271/114

WO 87/01423 3/1987 PCT Int'l Appl. .

OTHER PUBLICATIONS

Xerox Disclosure Journal, vol. 9, No. 2, Apr. 1984, pp. 105–106, G. M. Garavuso, et al., "Paddle Wheel Feeder With Normal Force Optimization and Blade Control".
Toshiba Review, vol. 37, No. 5, Apr. 1982, pp. 439–442, K. Nakamura, et al., "Speed-Up of Banknote Handling Machine Feeding Apparatus".

Primary Examiner—Robert P. Olszewski
Assistant Examiner—Steven M. Reiss
Attorney, Agent, or Firm—Oblon, Spivak, McClelland, Maier & Neustadt

[57] ABSTRACT

An apparatus for feeding a sheet-like object comprises a motor, a fly-wheel rotated by the motor at a uniform speed, a rotor for displacing one of stacked sheet-like objects by a torque of the rotor in the direction of the torque, and a cam mechanism for converting the uniform speed rotational movement of the fly-wheel to non-uniform speed rotational movement, and transmitting the non-uniform speed rotational movement to the rotor. The cam mechanism comprises a stationary cam member, an orbit forming member formed on the cam member, a roller urged by uniform speed rotational movement of the fly-wheel to move along the orbit forming member, and a transmission mechanism for transmitting to the rotor non-uniform speed rotational movement obtained as a result of the movement of the roller along the orbit forming member.

16 Claims, 35 Drawing Sheets

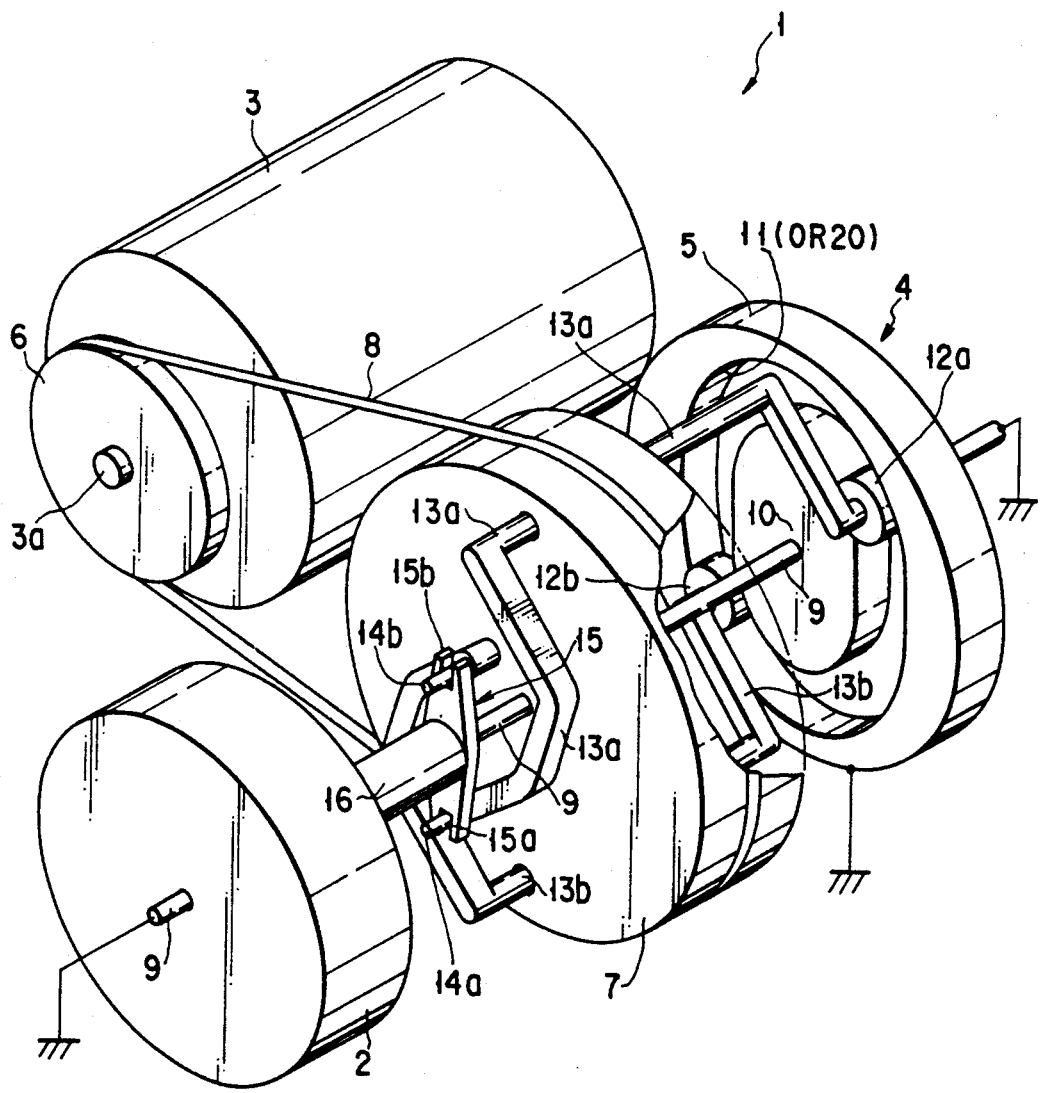
F I G. 7

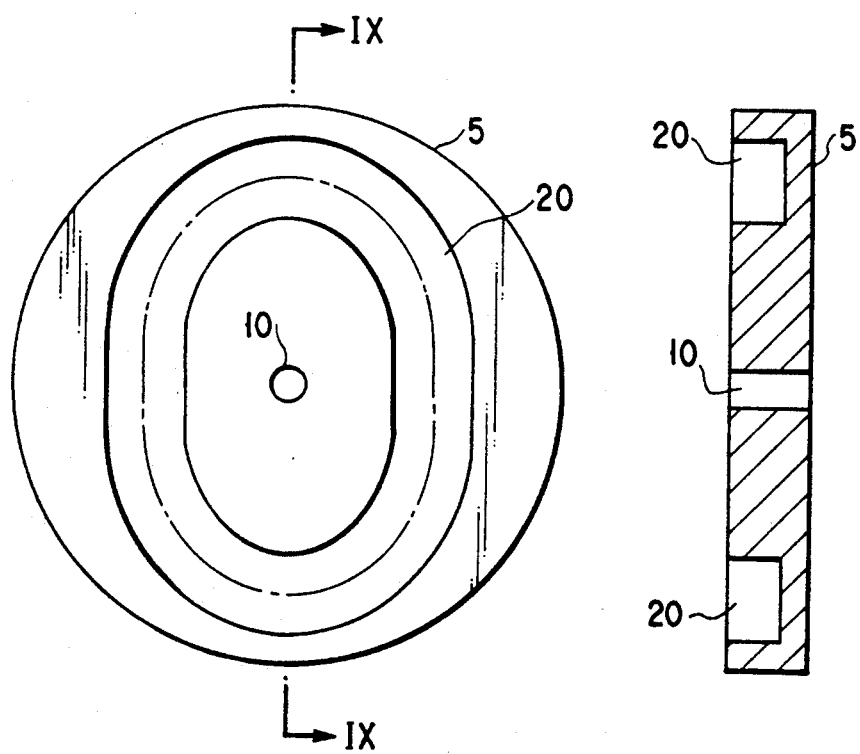
F I G. 9A    F I G. 9B

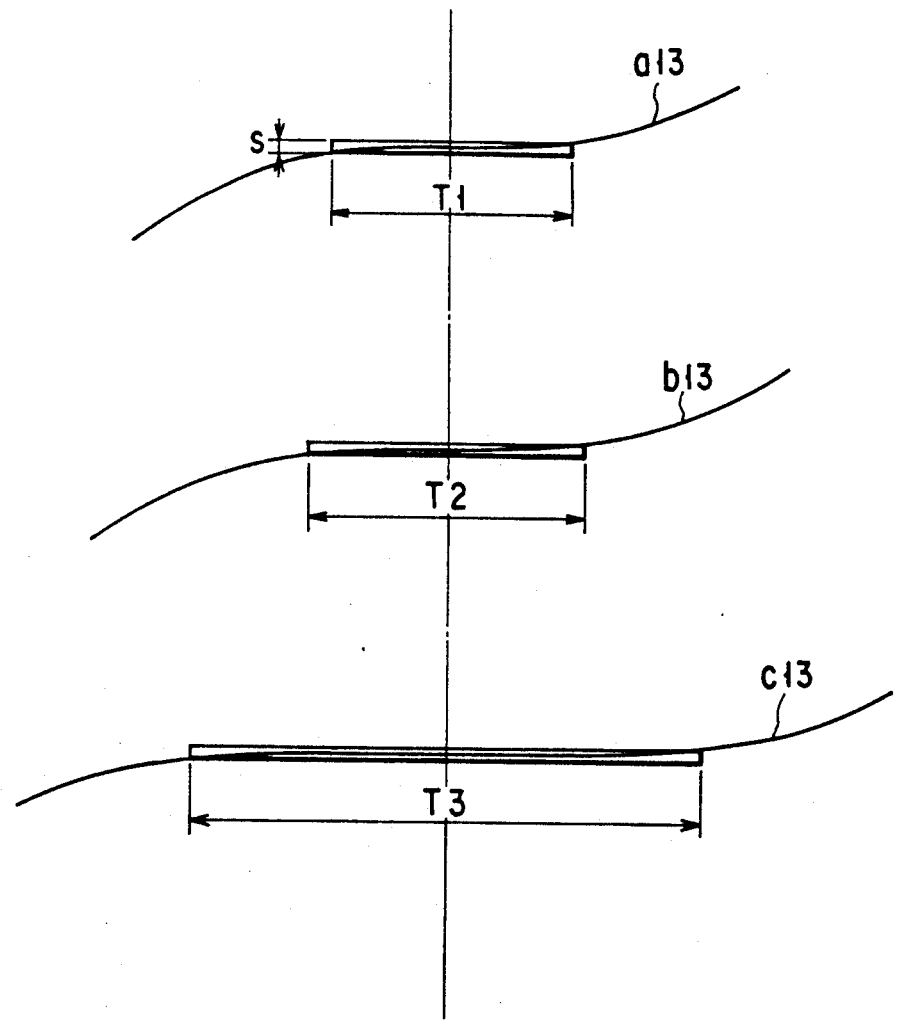
F I G. 13

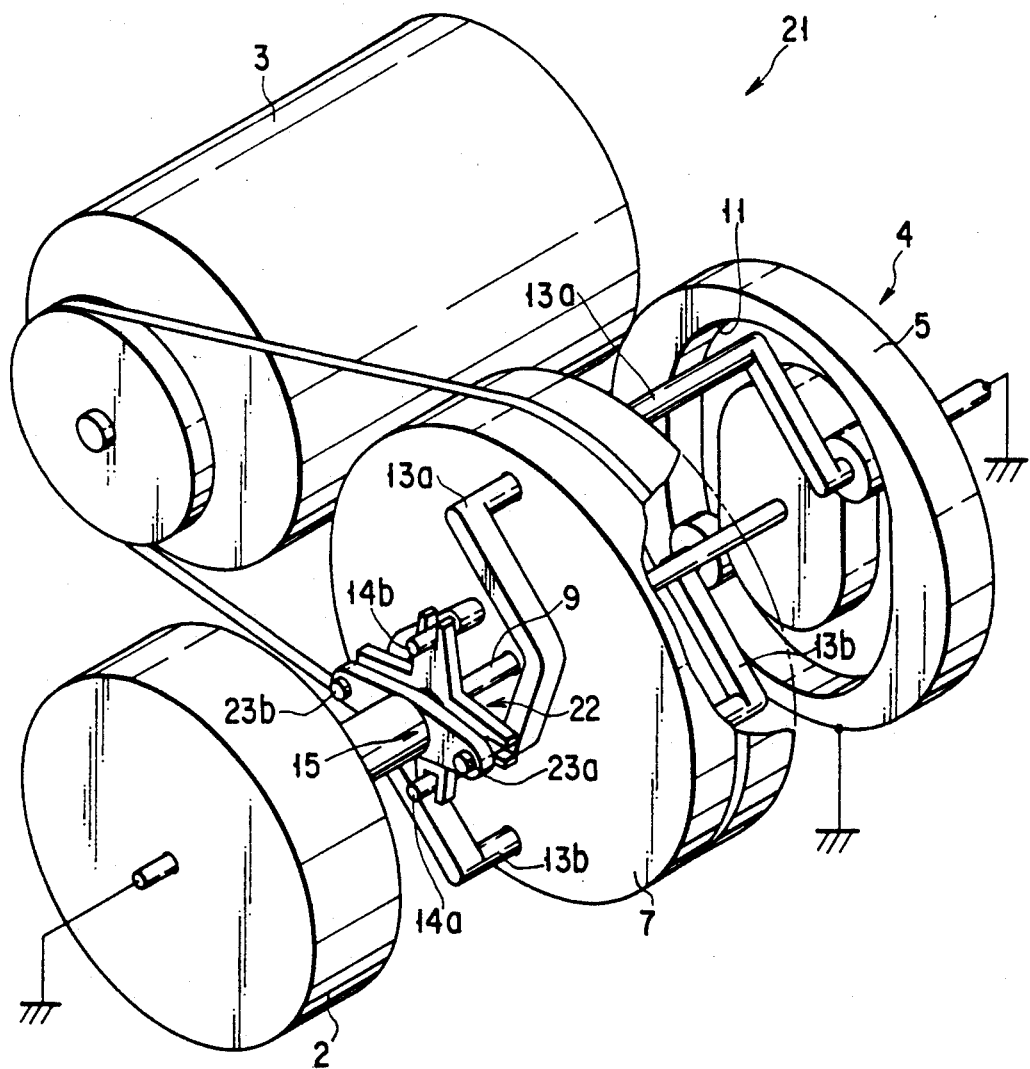
F I G. 14A
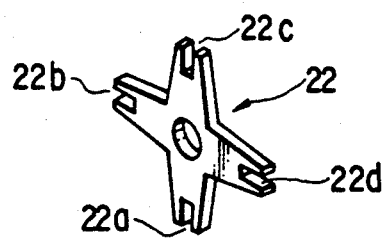
F I G. 14B

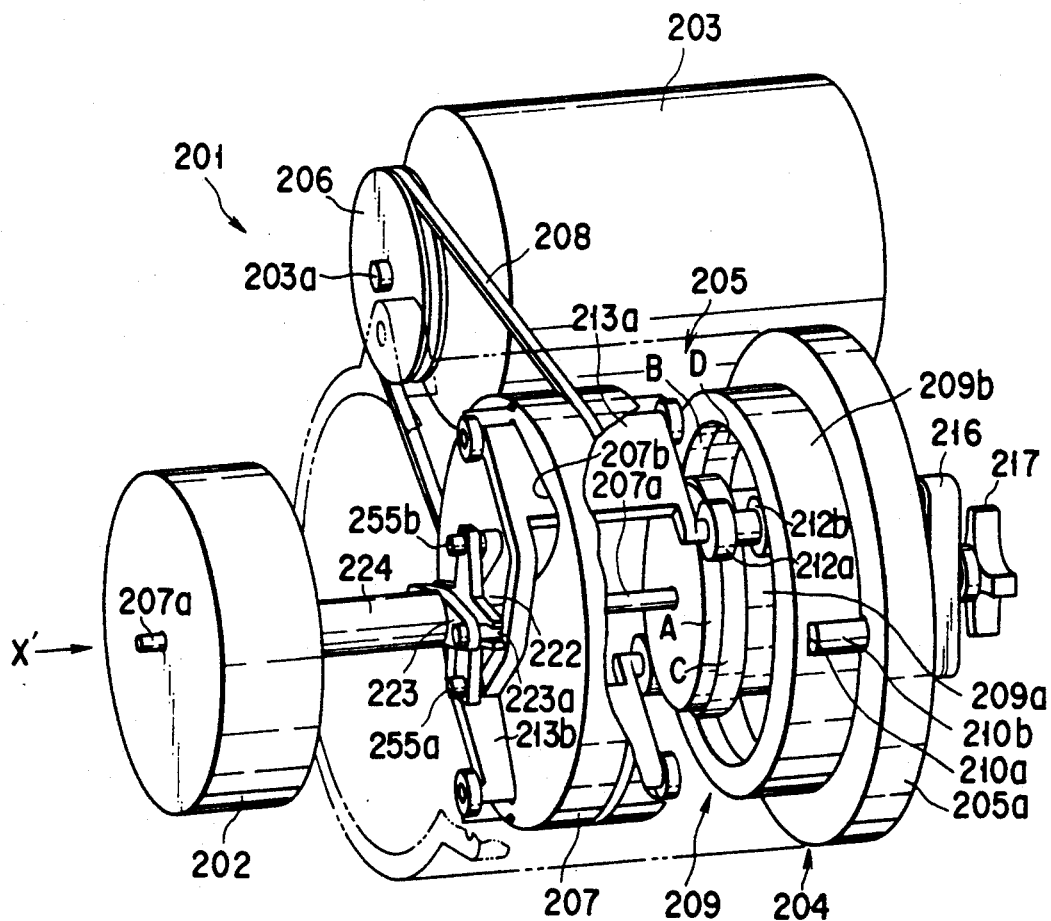
F I G. 22A
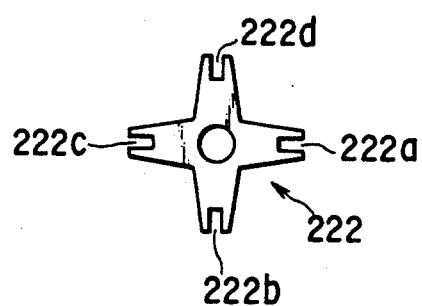
F I G. 22B

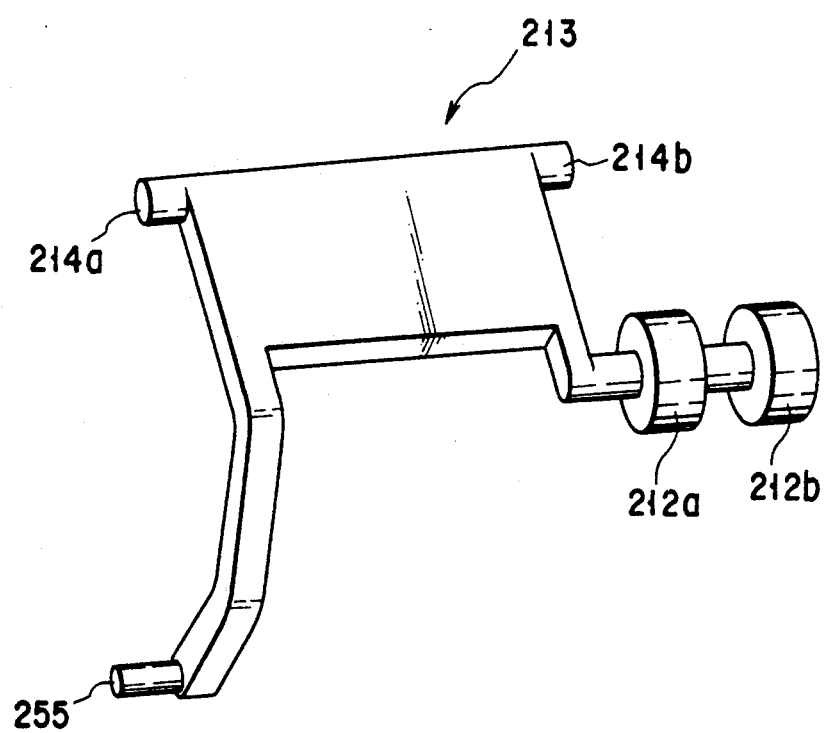
F I G. 24

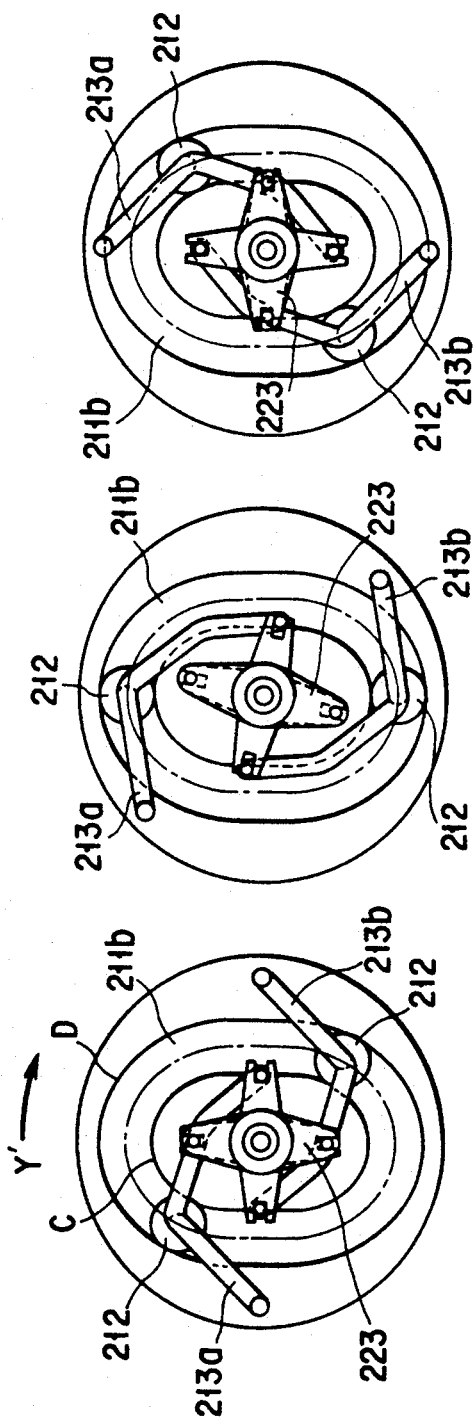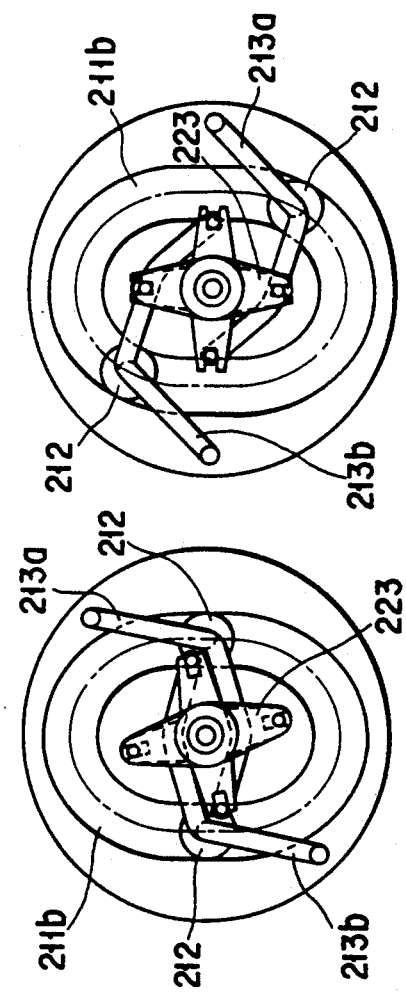

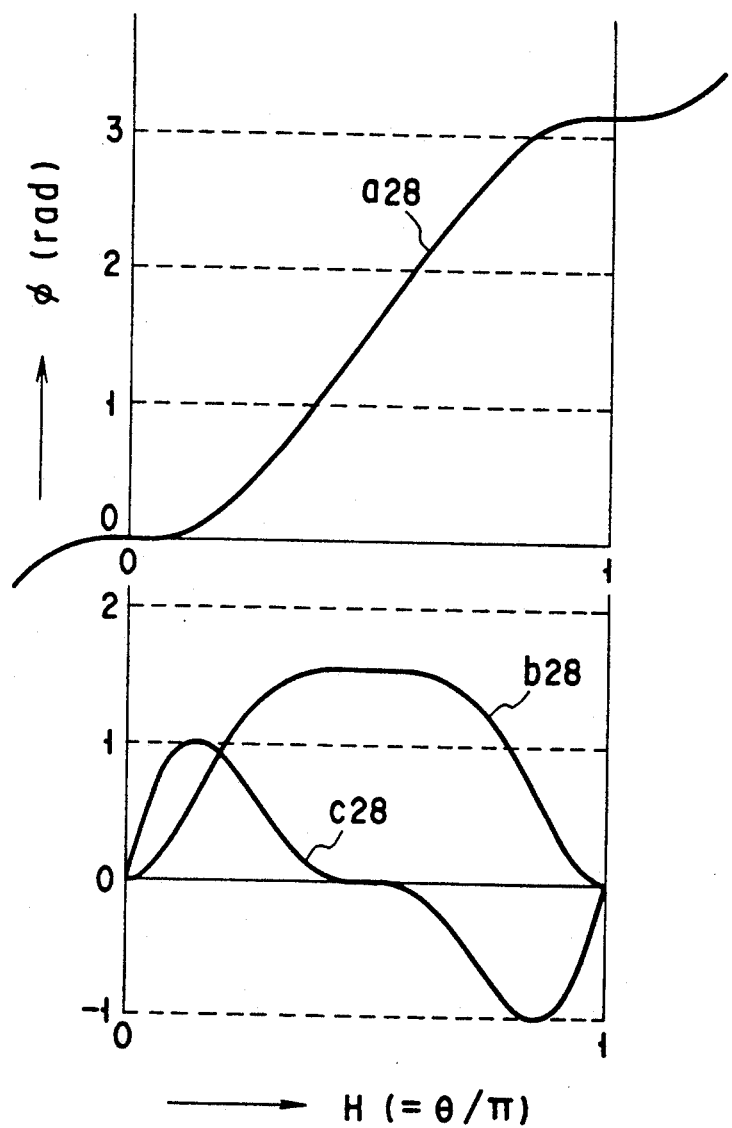
F I G. 28

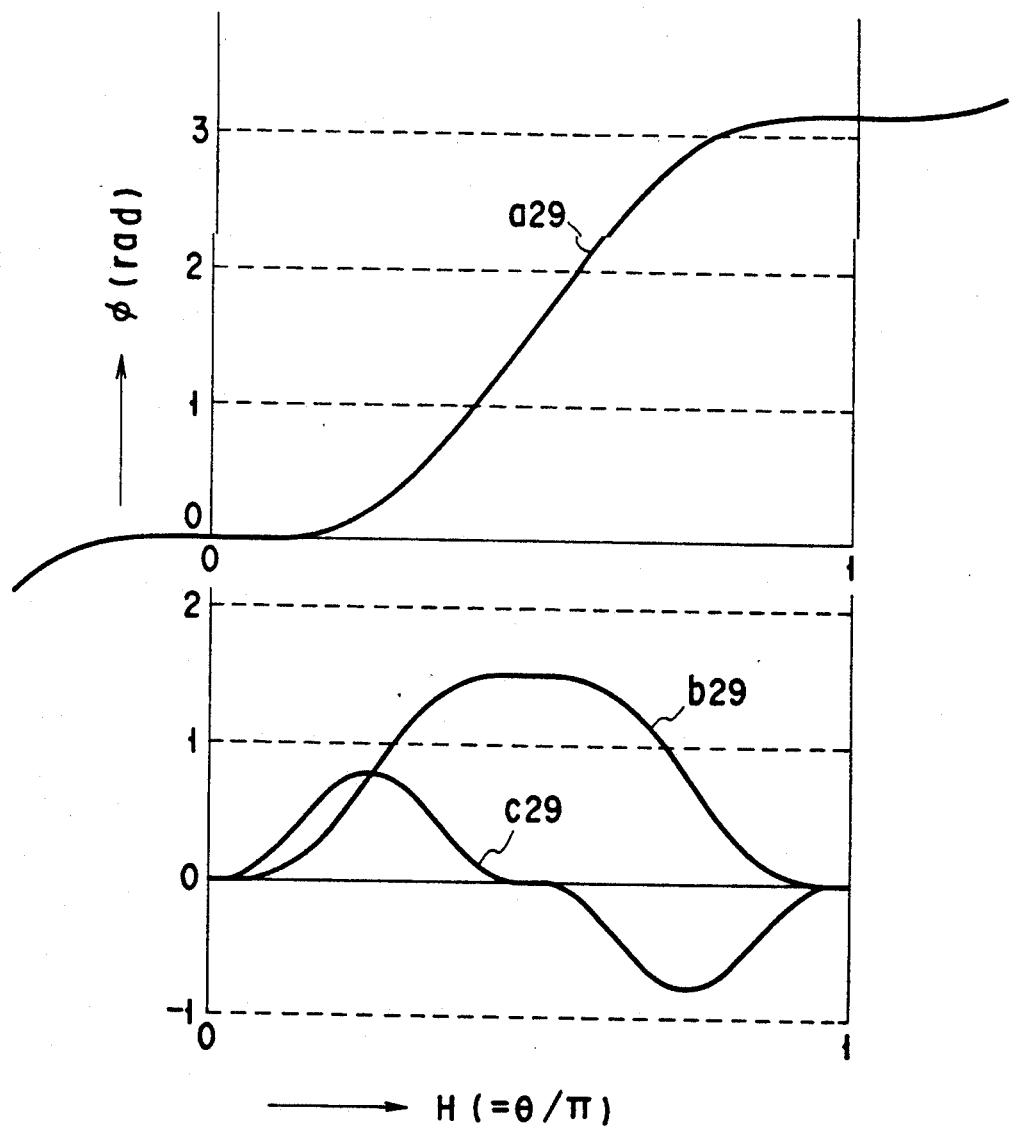
F I G. 29

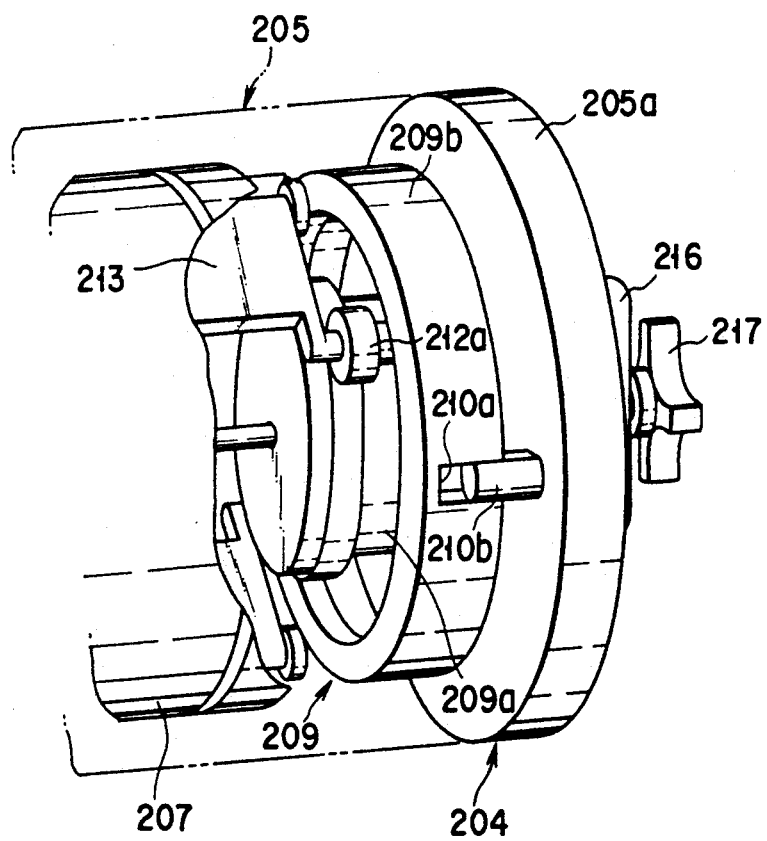
F I G. 31

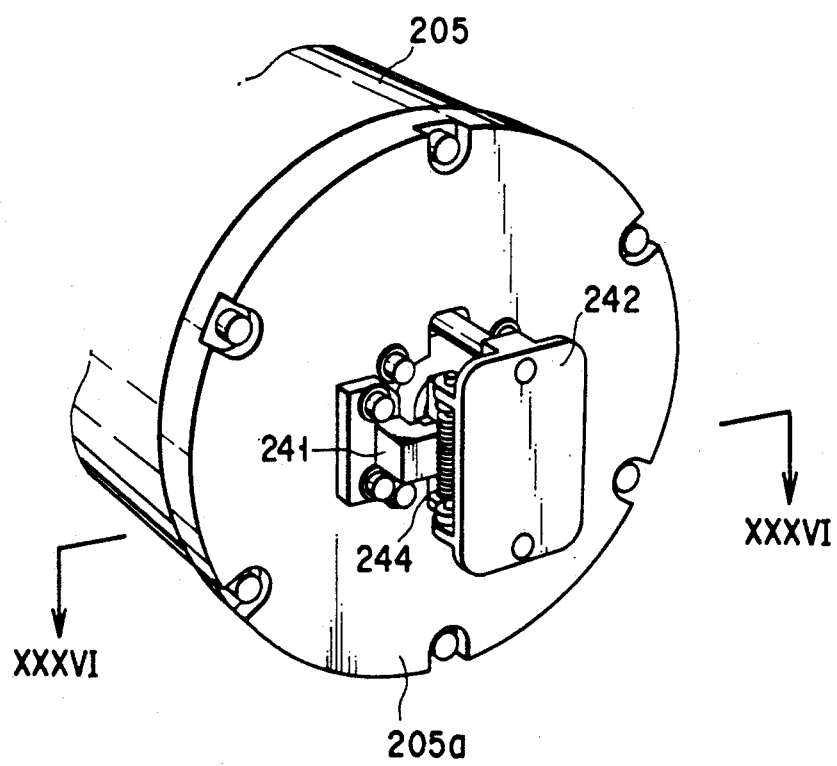
F I G. 34

APPARATUS FOR FEEDING SHEET-LIKE OBJECT

BACKGROUND OF THE INVENTION

1. Field of the Invention

The present invention relates to a sheet-like object feeding apparatus for feeding stacked sheet-like objects one by one at high speed.

2. Description of the Related Art

Typical sheet-like objects, to which the present invention is applied, are bank notes, data cards and printed matters. Hereinafter, this kind of sheet-like object is called simply "sheet." The sheet is subjected to various kinds of mechanical processing. The number of sheets to be processed has recently increased more and more, and the enhancement of processing performance in processing machines has been desired.

In the case of bank notes, there is a need to prepare batches of bank notes, each having a predetermined number of back notes. If this work is done by a person, that is inefficient; thus, the work is normally performed by automatic processing machines. Each batch of bank notes is bound by a belt.

There are known two methods of separating stacked sheets from one another, i.e. a "leafing" method and a "slipping" method. It was reported by NAKAMURA et al. that the slipping method is suitable for high-speed feeding ("TOSHIBA REVIEW", Vol. 37, No. 5, pp. 439-442).

Now referring to FIGS. 1 to 6, a description is given of sheet feeding apparatuses utilizing two conventional methods for feeding sheets one by one at high speed and with accuracy.

FIG. 1 is a perspective view showing first prior art of the sheet feeding apparatus. As is shown in FIG. 1, a sheet feeding apparatus 100 comprises mainly a feed rotor 101 for feeding a sheet by the slipping method, a motor 102, and an epicyclic gear mechanism 103 interposed between the motor 102 and the feed rotor 101. The epicyclic gear mechanism 103 receives a torque from the motor 102 and converts the torque to intermittent rotary movement (non-uniform rotary movement) and transmits the movement to the rotor 101. The epicyclic gear mechanism 103 comprises a solar gear 108 and two planetary gears 109a and 109b.

A pulley 104 is fixed to a shaft 102a of the motor 102. An endless belt 106 is passed between the pulley 104 and a fly-wheel 105. The fly-wheel 105 is rotatably supported on a center shaft 107.

Both end portions of the center shaft 107 are fixed to a chassis frame (not shown). The solar gear 108 is fixed to that part of the center shaft 107, which is near a first end portion of the center shaft 107, and accordingly the solar gear 108 is not rotatable. The two planetary gear 109a and 109b are arranged around the solar gear 108. The two planetary gears 109a and 109b revolve around the solar gear 108, while rotating about their axes. The number of teeth of each of the planetary gears 109a and 109b is just half the number of teeth of the solar gear 108.

The two planetary gears 109a and 109b are arranged around the solar gear 108 symmetrically in respect of the center shaft 107. First end portions of rotary shafts 110a and 110b are fixed to the planetary gears 109a and 109b. The rotary shafts 110a and 110b are parallel to the center shaft 107. Second end portions of the rotary shafts 110a and 110b penetrate the fly-wheel 105. Arms 111a and 111b are formed at the second end portions of the rotary shafts 110a and 110b. End portions of the arms 111a and 111b are bent at right angles in a substantially L-shape. Pins 112a and 112b extend from the bent end portions of the arms 111a and 111b along the rotary shafts 110a and 110b. The pins 112a and 112b are inserted into slots 113a and 113b formed in a crank arm 113.

The crank arm 113 has, at both end portions thereof, slots 113a and 113b extending in the longitudinal direction. A first end portion of a cylindrical member 114 is fixed to a center region of the crank arm 113. The longitudinal direction of the slots 113a and 113b coincides with that of the crank arm 113.

The longitudinal axis of the cylindrical member 114 coincides with that of the center shaft 107, and a second end portion of the center shaft 10 is inserted into the cylindrical member 114. The crank arm 113 is situated concentrically with the center shaft 107. A second end portion of the cylindrical member 114 is fixed to a center region of the rotor 101.

FIG. 2 is a perspective view showing second prior art of the sheet feeding apparatus. A sheet feeding apparatus 150, too, comprises mainly a rotor 101 for feeding sheets by the slipping method, a motor 102 for driving the feed rotor 101, and an epicyclic gear mechanism 103 for converting a uniform rotary movement of the motor 102 to intermittent rotary movement of the rotor 101.

The above-described structure of the sheet feeding apparatus 100 of the first prior art is similar to the sheet feeding apparatus 150 of the second prior art; however, the latter has the following different structural features. The feature of the structure of the sheet feeding apparatus 150 resides in the connection between the arms 111a and 111b and the crank arm 113. Specifically, in the sheet feeding apparatus 150, conrods 115a and 115b are interposed between the arms 111a and 111b and both end portions of the crank arm 113. The arm 111a and one end portion of the crank arm 113 are connected by means of pins 112a and 116a, and the arm 111b and the other end portion of the crank arm 113 are connected by means of pins 112b and 116b. The other structure is the same as that of the sheet feeding apparatus 100; thus, the common structural elements are denoted by like reference numerals, and detailed descriptions thereof are omitted.

The operation of the conventional sheet feeding apparatuses 100 and 150 will now be described, taking the sheet feeding apparatus 150 as an example. The fly-wheel 105 is rotated by the motor 102. Since the rotary shafts 110a and 110b having arms 111a and 111b are inserted into the fly-wheel 105, the rotary shafts 110a and 110b are rotated about the axis of the fly-wheel 105 in accordance with the rotation of the fly-wheel 105. The first end portions of the rotary shafts 110a and 110b are secured to the planetary gears 109a and 109b, and the planetary gears 109a and 109b are rotatable around the solar gear 108a with which the planetary gears 109a and 109b are meshed. Thus, the rotary shafts 110a and 110b are revolved about the axis of the fly-wheel 105 (hereinafter referred to simply as "revolution" as distinguished from "rotation") in the rotational direction of the fly-wheel 105, while being rotated about their own axes (hereinafter referred to simply as "rotation" as distinguished from "revolution"). The second end portions of these rotary shafts 110a and 110b are provided with the arms 111a and 11b for revolving the crank arm 113 and the pins 112a and 112b. Since the crank arm 113 is freely rotatable by the center shaft 107, the crank arm 113 and cylindrical member 114 rotate and also the rotor 101 fixed to the cylindrical member 114 rotates. Although the motor 102 and fly-wheel 105 are rotated at uniform speed, the rotor 101 is rotated at non-uniform speed. The non-uniform speed rotation of the rotor 101 is achieved by the mechanism including the arms 111a and 111b and crank arm 113 and the epicyclic gear mechanism 103.

FIGS. 3A to 3D are side views illustrating the operation of the epicyclic gear mechanism 103 of the sheet feeding apparatus 150, as viewed in the X-direction in FIG. 2. Dot-and-dash lines indicate the solar gear 108 and planetary gears 109a and 109b. Broken lines indicate how the meshed point between the solar gear 108 and planetary gear 109a moves from the state shown in FIG. 3A in accordance with the rotation of the planetary gear 109a.

At first, the fly-wheel 105 is rotated in the Y-direction from the state shown in FIG. 3A. On the other hand, the planetary gears 109a and 109b arranged around the solar gear 108 are simultaneously revolved and rotated by the rotary shafts 110a and 110b which are simultaneously revolved and rotated by the rotation of the fly-wheel 105. Thus, the relative position between the planetary gears 109a and 109b and the fly-wheel 105 is varied. As is shown in FIGS. 3B to 3D, the meshed point moves along a cycloid curve (broken line).

Since the meshed point between the planetary gears 109a and 109b moves along the cycloid curve, the angle between each con-rod 115a, 115b and the crank arm 113 varies successively. By the variation in angle, the amount of rotation of the crank arm 113 is rotated at non-uniform speed in relation to the uniform speed rotation of the fly-wheel 105, and intermittent rotational movement having short time stopping at FIGS. 3A and FIG. 3B are transmitted to the feed rotor 101.

FIGS. 4A to 4C are cross sectional views of the feed rotor 101, as viewed in the X-direction in FIG. 2, illustrating the sheet feeding operation of the feed rotor 101. A bottom portion of the feed rotor 101 is situated close to, or in contact with, the stacked sheets 130. From this state, the feed rotor 101 is rotated in the Z-direction.

A stationary block 117 is situated within the feed rotor 101. A vacuum chamber 118 is situated within the stationary block 117. The vacuum chamber 118 is kept in a vacuum state by means of a vacuum pump (not shown). The stationary block 117 and vacuum chamber 118 are fixed to the center shaft 107. Even when the feed roller 101 is rotated, the position of the stationary block 117 and vacuum chamber 118 remains unchanged. The vacuum chamber 118 has a suction portion 118a communicating with the outer wall of the feed rotor 101.

A plurality of suction holes 119a, 119b . . . are formed in the peripheral surface of the feed rotor 101 at regular intervals. The suction holes 119a, 119b . . . are sufficiently close to the stacked sheets 120. Although only one group of suction holes 119a, 119b . . . are shown in FIG. 4, other groups of suction holes 119a, 119b . . . are formed on both sides of said one group of holes along the center shaft 107.

Two rollers 120a and 120b are situated outside the feed rotor 101 on both sides of a line tangential to the bottom of the feed rotor 101. The rollers 120a and 102b are rotated in the directions of arrows by motors (not shown). In addition to the rollers 120a and 120b, two rollers (not shown ) are provided. A roller 122 is situated between the roller 120a and one of the two rollers not shown. A convey belt 121a is passed over the roller 120a, 122 and said one of the two rollers not shown. Another convey belt 121b is passed over the roller 120b and the other roller not shown. The convey belts 121a and 121b are superposed on each other at the roller 122. By virtue of the superposition of the convey belts 121a and 121b, one sheet 130 can be surely held.

Subsequently, the method of successively feeding the sheets 130 will now be described. The vacuum chamber 118 is kept in the vacuum position and the feed rotor 101 is rotated. By the rotation of the feed rotor 101, the suction hole 119a is brought into contact with the suction portion 118a of the vacuum chamber 118 (FIG. 4A). The first sheet 130a of the stacked sheets 130 situated near the bottom of the feed rotor 101 is sucked and conveyed in the rotational direction of the feed rotor 101. (A member 123 is provided to prevent two or more sheets being fed simultaneously.)

When the feed rotor 101 is further rotated, the subsequent suctions holes 119b, 119c . . . are brought to the position of the suction portion 118a, and the effect of sucking/conveying the sheet 130a is enhanced (FIG. 4B).

The feed rotor 101 is further rotated and all suction holes pass by the suction portion 118a of the vacuum chamber 118. At this time, the left end (in FIG. 4) of the sheet 130a is clamped between the convey belts 121a and 121b and is conveyed by these belts in the convey direction. In this manner, the sheets 130 are conveyed one by one.

Regarding the intermittent rotational movement of the feed rotor 101, the rotational speed is slowest in the state of FIG. 4A. The rotational speed increases in the order of the states shown in FIG. 4B and FIG. 4C, and decreases once again in the state of FIG. 4A.

FIG. 5 is a graph showing the relationship between the rotation amount $\theta$ of the fly-wheel 105 and the rotation amount $\theta$ of the feed rotor 101. The abscissa indicates $\theta/\pi$ ($=H$), or the input angle expressed by regarding the rotational angle of fly-wheel 105 as being dimensionless. The ordinate indicates $\phi$ (radian), or the output angle of the feed rotor 101 associated with the sheet feeding. From the graph, it is understood that the feed rotor 101 moves in an intermittent manner.

Curves b5 and c5 indicate the variations in speed and acceleration of the feed rotor 101 in relation to H. (Although the values of the curves vary greatly in accordance with the value of $\theta$, these values are divided by $\theta$ and the square of $\theta$ in the dimensionless manner.)

As is clear from curves b5 and c5, curves b5 and c5 are not symmetrical in respect of a boundary of $H=0.5$. In particular, regarding curve c5, the absolute values thereof differ greatly at extreme values (maximum acceleration and maximum deceleration) at two points in the vicinity of $H=0$ and $H=1$.

The reason why the absolute values of acceleration differ so greatly is that the sheet feeding apparatus 150 employs the pin coupling mechanism including the con-rods 115a and 115b. If the pin coupling mechanism is employed as in the sheet feeding apparatus 150 shown in FIG. 2, the cycloid curve produced by the epicyclic gear mechanism 103 is symmetrical in respect of $H=0.5$; however, the intermittent rotation speed and acceleration speed are not symmetrical, as shown in FIG. 5. In the case of the conventional sheet feeding apparatus 150 wherein the absolute values of acceleration differ greatly at the time of maximum acceleration and maximum deceleration, the deceleration peak increases particularly at the time of rotation of the feed rotor 101 and considerable noise and vibration occurs, which is not practically desirable.

By contrast, these problems are solved by the sheet feeding apparatus 100 shown in FIG. 1. The curves of intermittent rotational speed and acceleration produced by the epicyclic gear mechanism 103 are symmetrical in the vicinity of H=0.5, and the peaks of acceleration and deceleration coincide.

However, the sheet feeding apparatus 100 shown in FIG. 1 has the following drawback. In the sheet feeding apparatus 100, the rotational movement of the planetary gears 109a and 109b about the arms 111a and 111b produces rotational movement of the crank arm 113, but most of the rotational movement of the planetary gears 109a and 109b is converted to linear slide movement of the pins 112a and 112b along slits 113a and 113b. Consequently, when the pins 112a and 112b slide, a large frictional force due to load torque acts on the inner surfaces of the slits 113a and 113b, resulting in low transmission efficiency of force. Simultaneously, considerable noise and vibration occurs due to slide friction.

In connection with this, there are techniques of preventing as much as possible the slide friction between the pins 112a and 112b and the slits 113a and 113b, as shown in FIGS. 6A and 6B. FIG. 6A shows a technique wherein rotatable rollers 123a and 123b are attached to the pins 112a and 112b, and FIG. 6B shows a technique wherein sliding members 124a and 124b having outer shapes matching the shapes of the inner surfaces of the slits 113a and 113b are provided. Either technique, however, requires high precision of parts, increasing manufacture cost. In addition, the problem of slide friction cannot completely be solved. Thus, unless the technique of FIG. 2 using the pin coupling mechanism, wherein slide friction is little caused, is employed, the force transmission efficiency cannot be improved.

In either prior art technique described above, the epicyclic gear mechanism 103 is used as movement converting means for obtaining intermittent rotary movement. In the case of the mechanism using gears, however, the life of the apparatus cannot be increased remarkably owing to wear of the gear surfaces.

In designing the sheet feeding apparatus, it is required that the stop time of the feed rotor be as long as possible in the case where the time for a single rotation of the feed rotor is constant, thereby surely feeding sheets. However, if the epicyclic gear mechanism is used, as stated above, only the intermittent rotation curve corresponding to the cycloid curve is obtainable. It is impossible to freely design the rotational acceleration of the feed rotor and increase the stop time of the feed rotor.

As described above, in the conventional sheet feeding apparatus, when the pin coupling mechanism is employed, a difference arises between the absolute values of rotational acceleration, and noise and vibration occurs. On the other hand, when the linear slide movement is utilized, force transmission efficiency is lowered, and noise and vibration occurs owing to slide friction.

Each conventional sheet feeding apparatus described above adopts the epicyclic gear mechanism; thus, the intermittent rotational movement cannot be varied. Consequently, the stop time of the feed rotor cannot be increased as much as possible, and the sheet cannot surely be fed.

Furthermore, in actual cases, there are damaged sheets to be fed, and it is necessary to handle sheets of various conditions. For example, it is necessary to increase the stop time of the feed rotor, when damaged sheets are fed, compared to the case of feeding normal sheets, thereby to feed the damaged sheets carefully.

SUMMARY OF THE INVENTION

The object of the present invention is to provide an apparatus for feeding a sheet-like object, which solves the above prior-art problems, reduces noise and vibration to a minimum, and ensures sheet feeding.

This object is achieved by an apparatus for feeding a sheet-like object, comprising:
 driving means;
 a fly-wheel rotated by the driving means at a uniform speed;
 a rotor for displacing the sheet-like object by a torque of the rotor in the direction of the torque; and
 a cam mechanism for converting the uniform speed rotational movement of the fly-wheel to non-uniform speed rotational movement, and transmitting the non-uniform speed rotational movement to the rotor.

The object of the invention is also achieved by an apparatus for feeding a sheet-like object, comprising:
 driving means;
 a fly-wheel rotated by the driving means at a uniform speed;
 a rotor for displacing one of stacked sheet-like objects by a torque of the rotor in the direction of the torque; and
 a cam mechanism including:
  a stationary cam member;
  a non-circular groove including a curve which equalizes the absolute value of a maximum acceleration of the rotor to the absolute value of a minimum acceleration of the rotor.
  a roller urged by uniform speed rotational movement of the fly-wheel to move along the non-circular groove; and
  a transmission mechanism for transmitting to the rotor non-uniform speed rotational movement obtained as a result of the movement of the roller along the noncircular groove.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a perspective view showing a sheet feeding apparatus according to a first embodiment of the present invention.

FIGS. 9A and 9B show another example of a cam member and a non-circular groove, FIG. 9A being a plan view, and FIG. 9B being a cross-sectional view taken along line IX—IX in FIG. 9A;

FIG. 13 is a view for comparing the stop states of the feed rotor, by using the rotation angle $\phi$ of the feed rotor;

FIGS. 14A and 14B are perspective views showing a sheet feeding apparatus according to a second embodiment of the invention;

FIGS. 22A and 22B are perspective views showing a sheet feeding apparatus according to a sixth embodiment of the invention;

FIG. 24 is a perspective view showing the arm to which rollers are coupled;

FIGS. 27A to 27E illustrate how the rollers move along the non-circular grooves of the cam mechanism;

FIG. 28 is a graph showing an example of the relationship between the rotation angle $\theta$ of the fly-wheel and the rotation angle $\theta$ of the feed rotor in the sheet feeding apparatus of the sixth embodiment of the present invention;

FIG. 29 is a graph showing an example of the relationship between the rotation angle $\theta$ of the fly-wheel and the rotation angle $\phi$ of the feed rotor in the sheet feeding apparatus of the sixth embodiment of the present invention;

FIG. 31 is a perspective view illustrating the state in which the non-circular groove is switched in the present invention;

FIG. 34 is a perspective view showing a sheet feeding apparatus according to an eighth embodiment of the invention;

DETAILED DESCRIPTION OF THE PREFERRED EMBODIMENT

Figure 1:
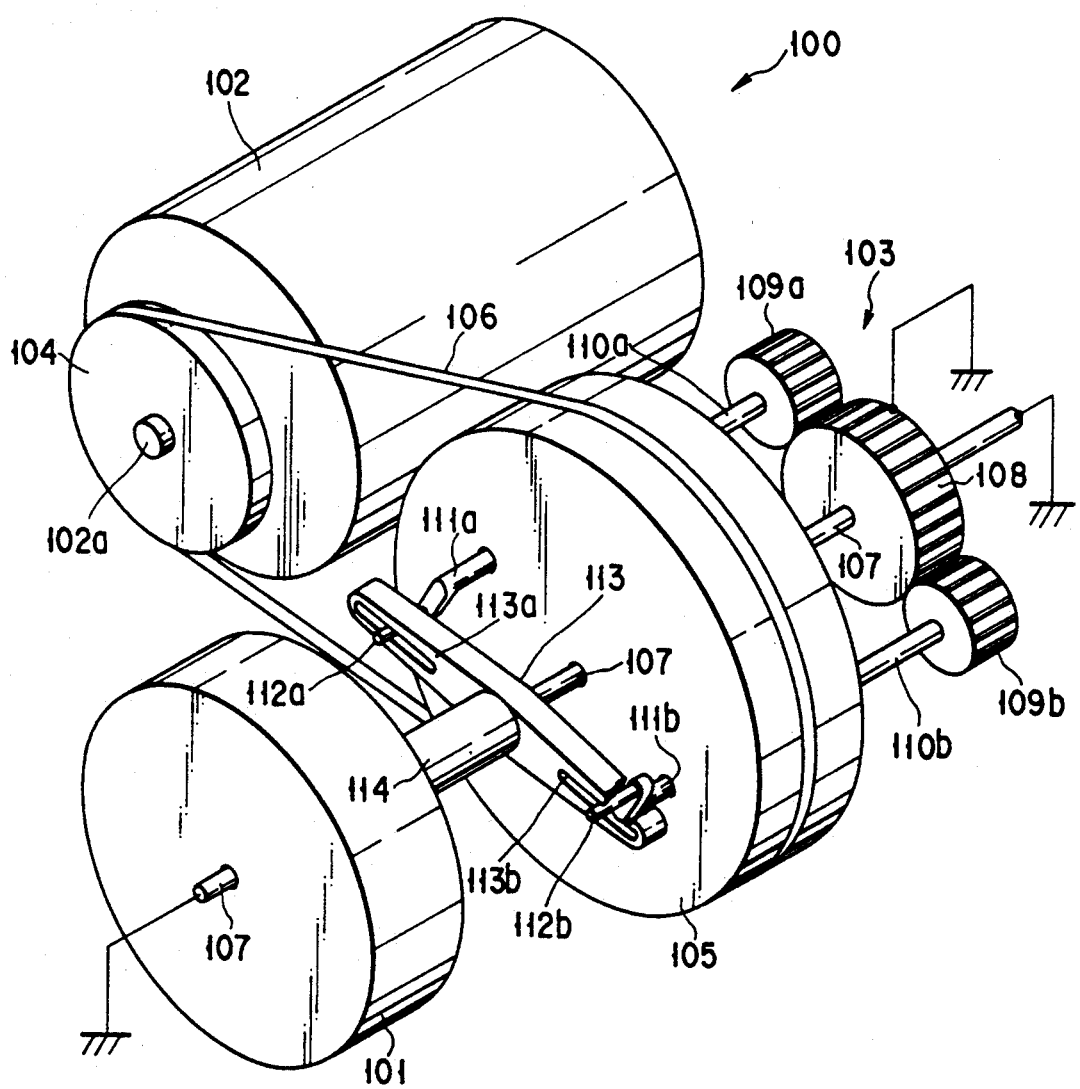
FIG. 1 is a perspective view showing first prior art of a sheet feeding apparatus.

The present invention will now be described in detail with reference to the accompanying drawings.

FIG. 7 is a perspective view showing a sheet feeding apparatus according to a first embodiment of the present invention. A sheet feeding apparatus 1 comprises mainly a feed rotor 2 for feeding sheets by the slipping method, a motor 3, and a cam mechanism 4 inter posed between the motor 3 and the feed rotor 2. The cam mechanism 4 receives a torque from the motor 3 and converts the torque to intermittent rotary movement (non-uniform rotary movement) and transmits the movement to the rotor 2.

A pulley 6 is fixed to a motor shaft 3a of the motor 3. An endless belt 8 is passed between the pulley 6 and a fly-wheel 7.

The fly-wheel 7 is rotatably supported on a center shaft 9. Both end portions of the center shaft 9 are fixed to a chassis frame (not shown).

Figures 8A, 8B:
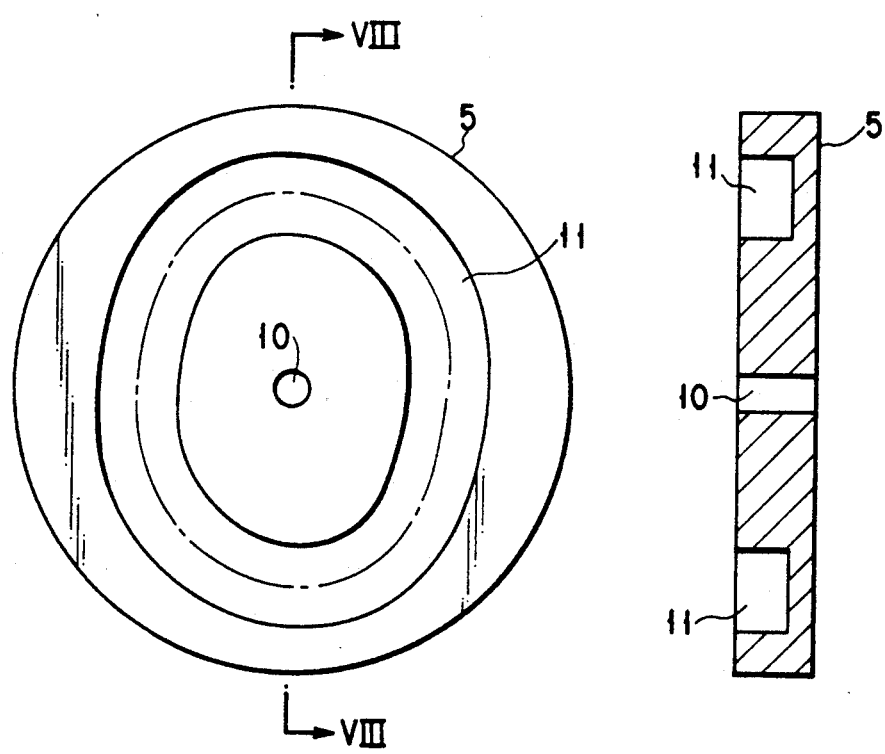
FIGS. 8A and 8B show an example of a cam member and a non-circular groove, FIG. 8A being a plan view, and FIG. 8B being a cross-sectional view taken along line VIII—VIII in FIG. 8A.

As is shown in FIGS. 8A and 8B, the cam mechanism 4 has a disc-shaped cam member 5. FIG. 8A is a front view of the cam mechanism 4 and FIG. 8B is a cross-sectional view taken along line VIII—VIII in FIG. 8A. A non-circular groove 11 serving as an orbit-forming member is formed in one side surface of the cam member 5. The non-circular groove 11 is formed on the assumption that rollers 12a and 12b revolve around the center portion 10 in a clockwise direction, facing the upper surface of the sheet to be fed. The cam member 5 is fixed to the chassis frame (not shown).

The rollers 12a and 12b, distanced by 180° in respect of the center portion 10, are arranged within the non-circular groove 11. The rollers 12a and 12b are movable along the non-circular groove 11.

Arms 13a and 13b are provided in parallel to the center shaft 9, and their middle portions are passed through a peripheral portion of the fly-wheel 7. Both longitudinal end portions of each arm 13a, 13b are provided with bent portions which are bent 90° perpendicularly to the center shaft 9, as shown in FIG. 9.

Pins, parallel to the center shaft 9, are formed at distal end portions of the bent portions provided at first end portions of the arms 13a and 13b. These pins support the rollers 12a and 12b rotatably. Similarly, pins 14a and 14b are formed at distal end portions of the bent portions provided at second end portions of the arms 13a and 13b.

Shallow slits 15a and 15b are formed at both longitudinal end portions of a crank arm 15. A first end portion of a hollow-cylindrical member 16, which is parallel to the center shaft 9, is fixed to a middle portion of the crank arm 15. The pins 14a and 14b of the arms 13a and 13b are engaged in the slits 15a and 15b of the crank arm 15. A second end portion of the hollow-cylindrical member 16 is fixed to a center part of the feed rotor 2. The center shaft 9 is inserted from the first end of the hollow-cylindrical member 16, whereby the crank arm 15 is situated concentrically with the center shaft 9 and the hollow-cylindrical member 16 and the feed rotor 2 are freely rotatable relative to the center shaft 9. Accordingly, the crank arm 15 is coupled to the feed rotor 2 by means of the hollow-cylindrical member 16.

The operation of the sheet feeding apparatus 1 according to the first embodiment will now be described. The fly wheel 7 is rotated by the motor 3. Since the arms 13a and 13b are inserted through the fly wheel 7, the arms 13a and 13b are revolved about the center shaft 9 as the fly wheel 7 is rotated. The rollers 12a and 12b of the cam mechanism 4 are provided at the first end portions of the arms 13a and 13b so as to be able to revolve along the non-circular groove 11 of the cam mechanism 4; thus, the arms 13a and 13b are revolved about the center shaft 9 (hereinafter referred to simply as "revolution" as distinguished from "rotation") in the rotational direction of the fly wheel 7 and are simultaneously rotated about their own axes (hereinafter simply as "rotation" as distinguished from "revolution") in accordance with the rotation of the fly wheel 7.

The pins 14a and 14b for rotating the crank arm 15 are provided at the second end portions of the revolvable and rotatable arms 13a and 13b, and the crank arm 15 is rotatable about the center shaft 9; accordingly, the crank arm 15 and hollow-cylindrical member 16 are rotated, and the rotor 2 fixed to the hollow-cylindrical member 16 is also rotated. Although the motor 3 and fly wheel 7 are rotated at uniform speed, the rotor 2 is rotated at non-uniform speed. The non-uniform speed rotation of the rotor 2 is achieved by the cam mechanism 4 and the mechanism including the arms 13a and 13b, crank arm 15, etc.

The operation of the cam mechanism 4, arms 13a and 13b, crank arm 15, etc. for rotating the rotor 2 at non-uniform speed will now be described with reference to FIGS. 10A to 10G. FIGS. 10A to 10G illustrate the relationship between the non-circular groove 11 formed in the cam member 5 and the rollers 12a and 12b movable along the non-circular groove 11. In these figures, the arms 13a and 13b are revolved around the center shaft 9.

Figure 10D:
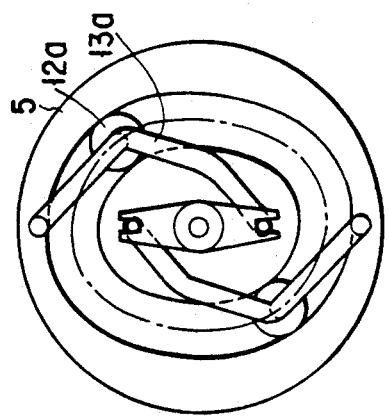
FIGS. 10A to 10G illustrate how the rollers move along the non-circular groove formed in the cam member.
Figure 10C:
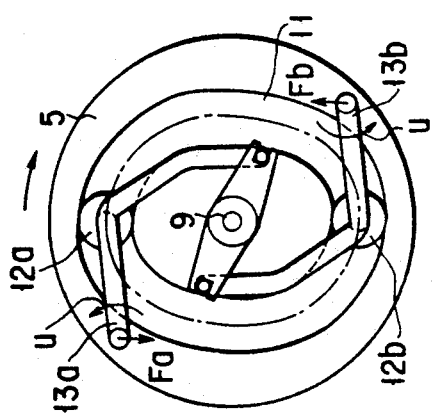
Figure 10G:
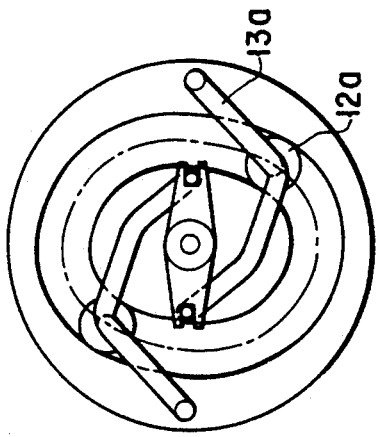
Figure 10B:
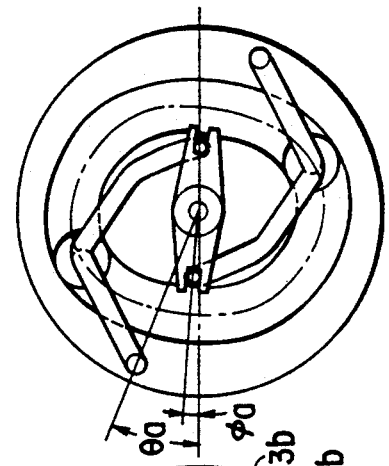
Figure 10F:
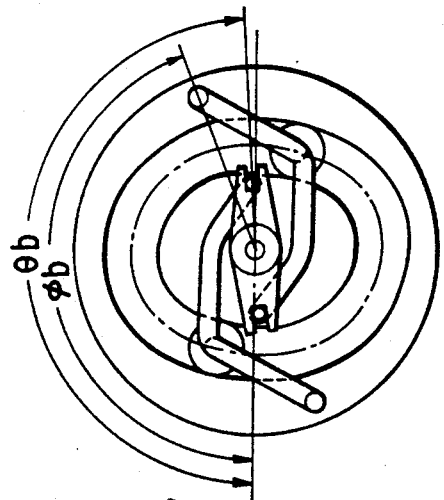
Figure 10A:
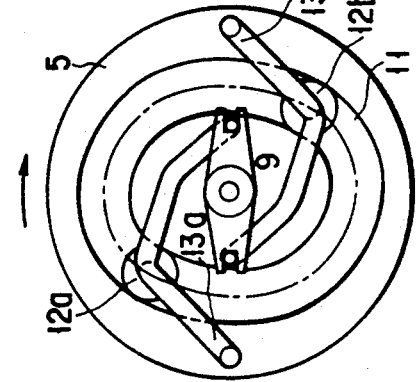
Figure 10E:
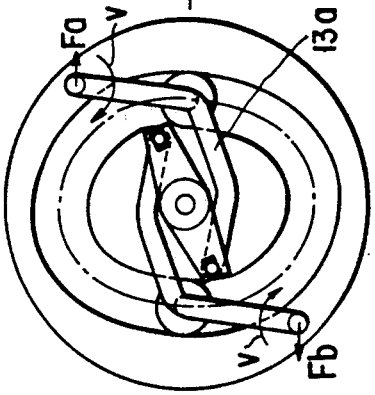

In FIG. 10A, the rotational angle of the fly wheel 7 and arms 13a and 13b is zero, and of course the rotational angle of the crank arm 15 is zero. In FIG. 10B, the rotational angle of the fly wheel 7 and arms 13a and 13b is about 20°, and that of the crank arm 15 is about 5°. In FIG. 10C, the rotational angle of the fly wheel 7 and arms 13a and 13b is 45°, and that of the crank arm 15 is about 20°. In FIG. 10D, the rotational angle of the fly wheel 7 and arms 13a and 13b is 90°, and that of the crank arm 15 is 90°, too. In FIG. 10E, the rotational angle of the fly wheel 7 and arms 13a and 13b is 135°, and that of the crank arm 15 is about 160°. In FIG. 10F, the rotational angle of the fly wheel 7 and arms 13a and 13b is about 160°, and that of the crank arm 15 is about 175°. In FIG. 10G, the rotational angle of the fly wheel 7 and arms 13a and 13b is 180°, and that of the crank arm 15 is of course 180°.

More specifically, the fly wheel 7 is rotated in the direction of arrow A from the state of FIG. 10A. In the state of FIG. 10C shifted from that of FIG. 10A, the rotational angle of the arms 13a and 13b is 45°, whereas that of the crank arm 15 is about 20°. In particular, in the state of FIG. 10B wherein the arms 13a and 13b and crank arm 15 start to rotate, the rotational angle of the crank arm is $\phi a$ (about 5°) when the rotational angle of the arms 13a and 13b is $\theta a$ (about 20°), that is, $\theta a >> \phi a$.

When the state of FIG. 10C has shifted to that of FIG. 10E, the rotational angle of the crank arm 15 is greater than that of the arms 13a and 13b, inversely.

When the state of FIG. 10E has shifted to that of FIG. 10G, the arms 13a and 13b rotate 45° whereas the crank arm 15 rotates only slightly, as in the state of FIG. 10C shifted from the state of FIG. 10A, thus returning to the original state (FIG. 10A). In particular, in the state of FIG. 10F just before the arms 13a and 13b and crank arm 15 return to the original state, the rotational angle of the crank arm is $\phi b$ (about 175°) when the rotational angle of the arms 13a and 13b is $\theta b$ (about 160°), that is, $(180° - \theta b) >> (180° - \phi b)$.

The above relationship in rotational angle between the arms 13a and 13b and the crank arm 15, i.e. between the fly wheel 7 and the feed rotor 2, achieves the non-uniform speed rotation of the rotor 2. The above relationship in rotational angle between the fly wheel 7 and the feed rotor 2 can be freely determined by the method of designing the non-circular groove 11 of the cam member 5.

Figure 5:
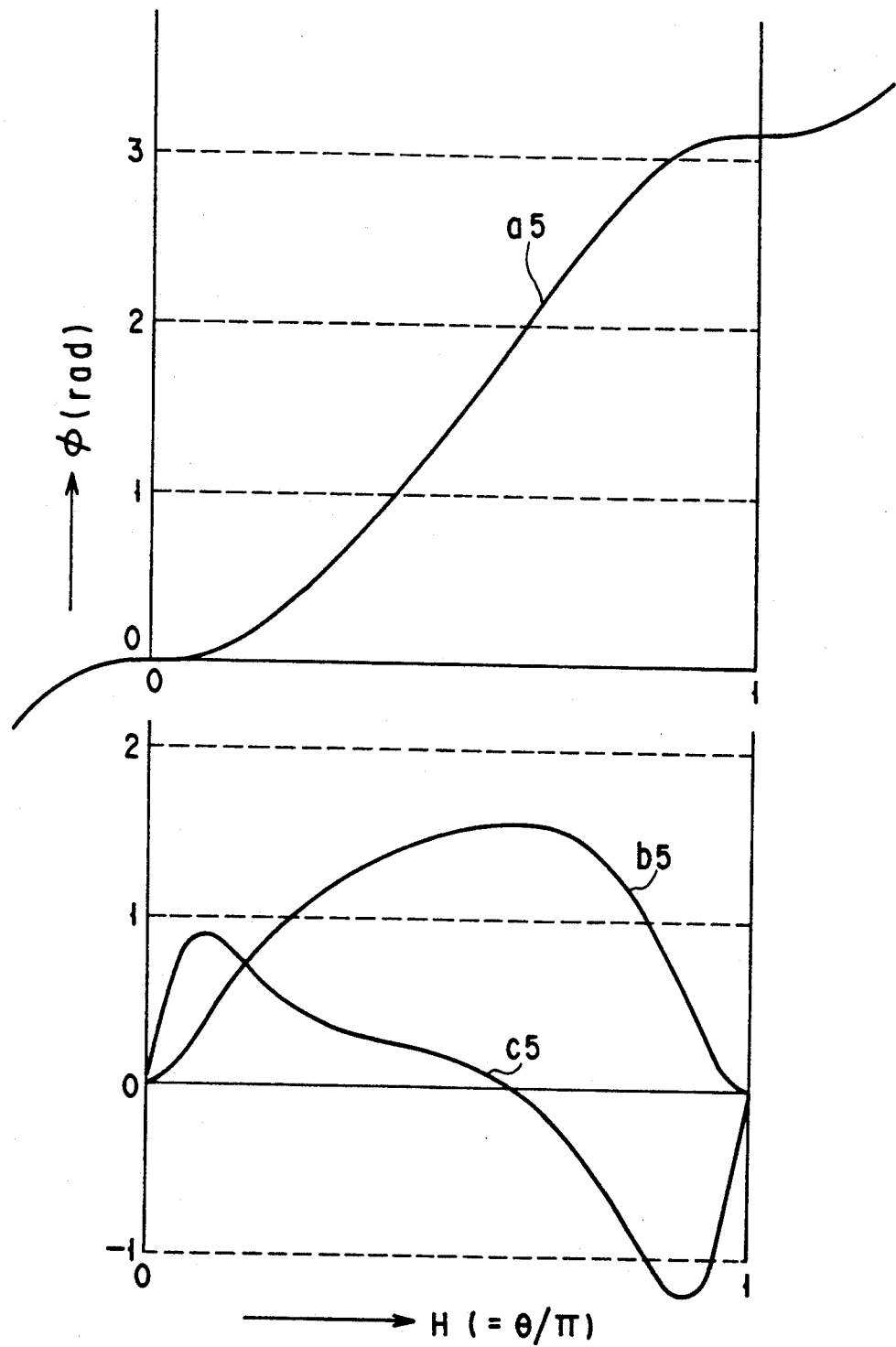
FIG. 5 is a graph showing the relationship between the rotation angle $\phi$ of the fly-wheel and the rotation angle $\theta$ of the feed rotor in the conventional sheet feeding apparatus.
Figure 6A:
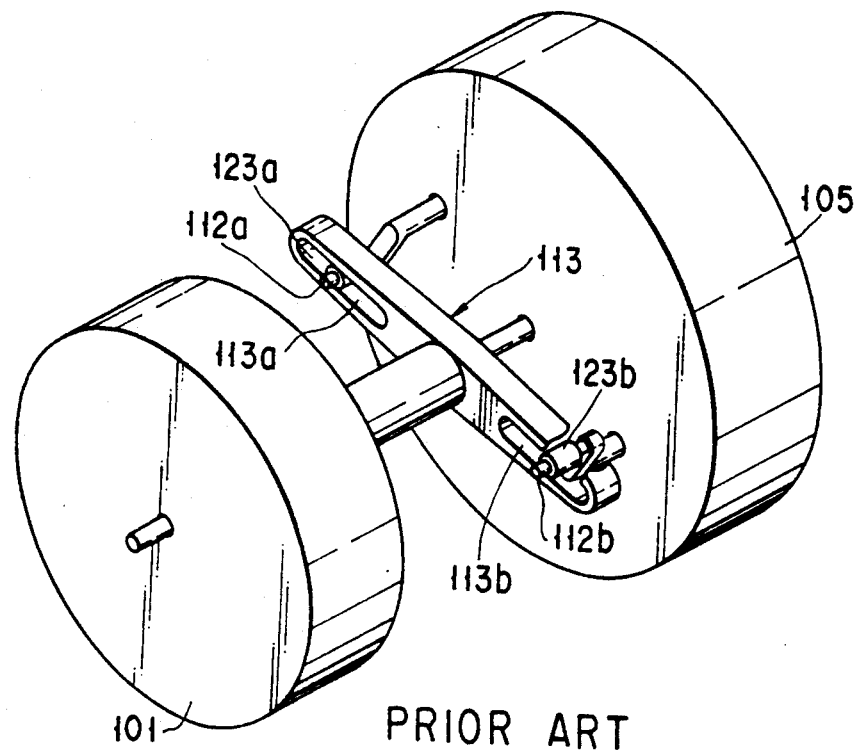
FIGS. 6A and 6B are enlarged perspective views showing important portions of the sheet feeding apparatus shown in FIG. 1.
Figure 6B:
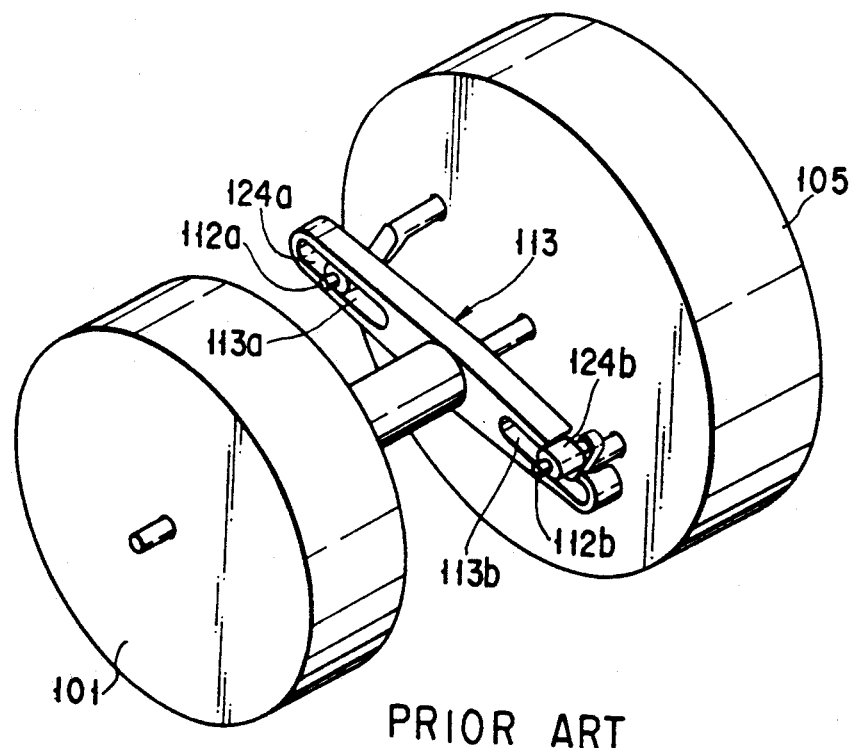

In the case of the cam member 5 having the non-circular groove 11 as shown in FIG. 8A, the fly wheel 7 and feed rotor 2 have the relationship in rotational angle, as shown in FIG. 5. The abscissa indicates $\theta$ or the input angle expressed by regarding the rotational angle of fly-wheel 7 or arms 13a and 13b as being dimensionless. Here, $\theta/\pi = H$. The ordinate indicates $\phi$ or the rotation angle of the feed rotor 2 or crank arm 15 associated with the sheet feeding.

In designing the non-circular groove 11, the rotational acceleration curve of the feed rotor 2 associated with the required intermittent rotational movement is first supposed. Then, the rotational angle curve for realizing the rotational acceleration curve is found by integration. The obtained rotational angle curve is successively differentiated, thereby finding the final rotational acceleration curve and determining the shape of the non circular groove 11.

Figure 11:
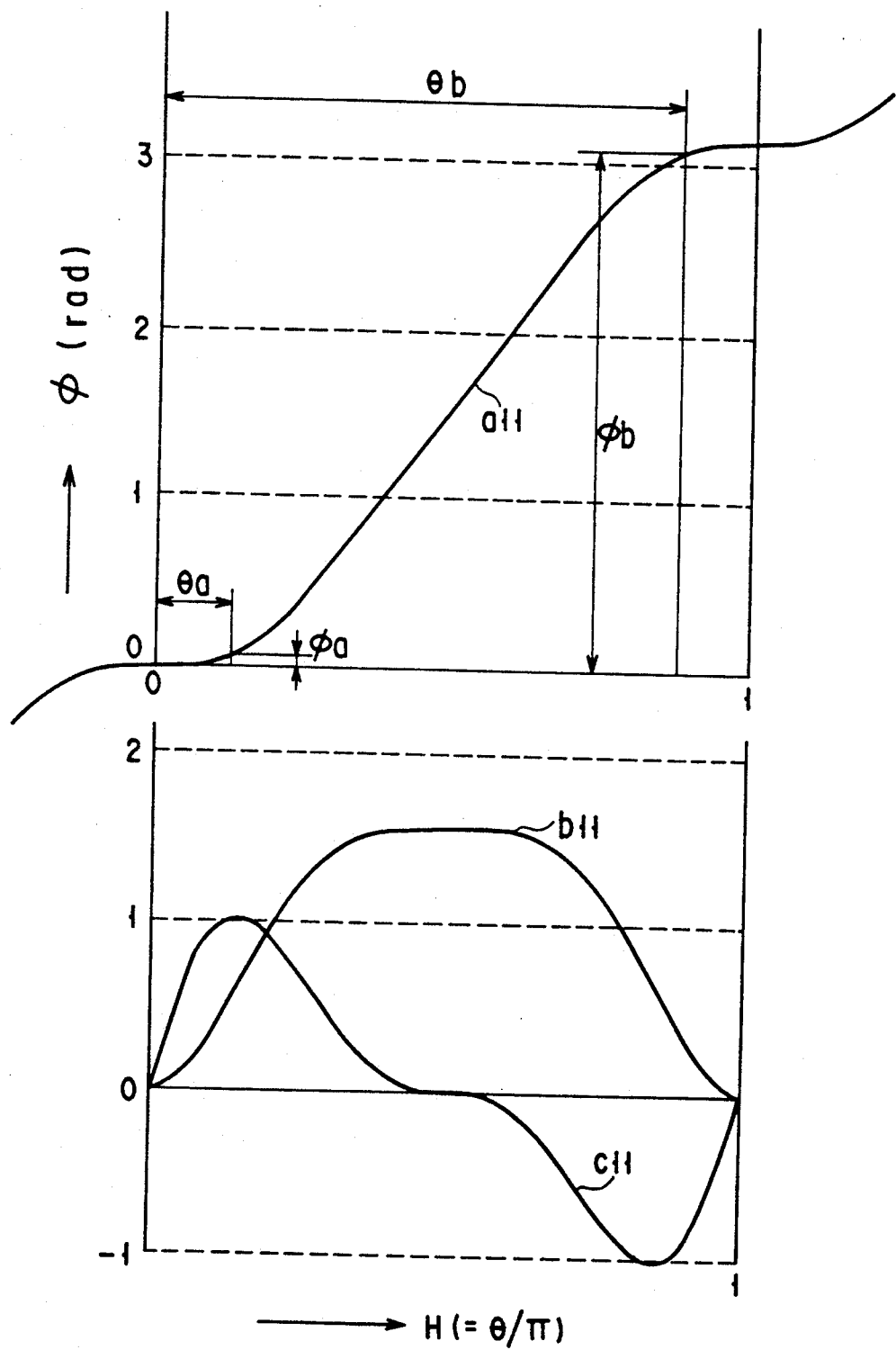
FIG. 11 is a graph showing an example of the relationship between the rotation angle $\theta$ of the fly-wheel and the rotation angle $\phi$ of the feed rotor in the sheet feeding apparatus of the present invention.

As an example of the method of designing the non-circular groove 11, the design of the curve shown in FIG. 11 will now be introduced.

First, the rotational acceleration Φ of the output angle φ is supposed by the following equation:

$$\Phi = (\phi) = U = AH^p(H-0.5)^q \qquad (1)$$

(Equation (1) is only a supposed one. If a given equation is supposed according to necessity, the intermittent rotation of the feed rotor 2 can be varied.)

By choosing p and q in equation (1), equation (1) is integrated. Of course, p and q are freely chosen.

$$\phi = \int\int U dH dH \qquad (2)$$

(In the curve of FIG. 11, p=1.2, and q=3.)

Supposing $\phi = \pi/2$ when H=0.5 in equation (2), the value of A in equation (1) can be obtained.

In this way, a curve in a range of H=0 to 0.5 is obtained, and this curve is extended by using a curve which is rotation-symmetric by 180° in respect of points (½, π/2). Thus, a rotational angle curve of the feed rotor 2 in the range of H=0 to 1 of these curves is obtained.

The inclination of the obtained curves based on φ is 0 at the points of H=0 and H=1, which is necessary properties for the rotation of the feed rotor 2. (See curve a11 in FIG. 11.) Accordingly, the rotor 2 rotates intermittently, whereby the rotor 2 stops temporarily when the sheet is just fed out.

Next, the rotational angle speed of φ will now be considered. Since the rotational angle speed is a differential value of φ, it is expressed by equation (3).

$$\frac{d\phi}{dH} = \frac{d\phi}{d\theta} \cdot \frac{d\theta}{dH} = \frac{d\phi}{dt} \cdot \frac{dt}{d\theta} \cdot \pi \qquad (3)$$

Equation (3) is further expressed as follows:

$$\frac{\phi}{\theta} = \frac{d\phi}{dH} \cdot \frac{1}{\pi} \qquad (4)$$

By differentiating equation (2) by H, equation (4) is obtained, which corresponds to curve b11 in FIG. 11.

Similarly, the rotational angle speed is expressed by $$\frac{d^2\phi}{dH^2} = \frac{\Phi}{\theta^2} \cdot \pi^2 \qquad (5)$$

Equation (5) is further expressed as follows:

$$\frac{\phi}{\theta^2} = \frac{d^2\phi}{dH^2} \cdot \frac{1}{\pi^2} \qquad (6)$$

By differentiating equation (2) by H in two stages, equation (6) is obtained, which corresponds to curve c11 in FIG. 11. By this procedure, curves a11, b11 and c11 are successively obtained.

Of course, by choosing the supposed equation (1) or the values of p and q of equation (1), the shapes of the curves produced by the intermittent rotational movement can be varied. In designing the curves, it is desirable to consider the following three points:

1) FIG. 13 are enlarged views of curves of the rotational angle φ of the feed rotor 2 in the vicinity of H=0 and H=1 (θ=0 and θ=180°). When the fly wheel 7 is rotated at angular speed Θ (Θ is a time-differentiated value of θ) and the rotor 2 is rotated accordingly at a rotational angle φ, if the rotational angle φ is within a range of a minimum value s, it can be thought that the feed rotor 2 is substantially stopped. Specifically, the time T required to rotate the rotor 2 at minimum value s is a stop time. If the time T is increased, a more sure feed operation can be achieved (in FIG. 13 curve a13 shows prior art and curve b13 shows the first embodiment).

2) It is desirable that the rotational angle acceleration Φ indicated by curve c13 be determined so that the absolute value of acceleration is low, and the load torque IΦ (I= the polar inertia moment of the part rotating intermittently) due to inertia of intermittent rotation be low. Thereby, the load torque of motor 3 and noise and vibration can be reduced. In addition, if the angular acceleration curve is made gentle with a less variation factor, noise and vibration can be reduced further.

Figure 4A:
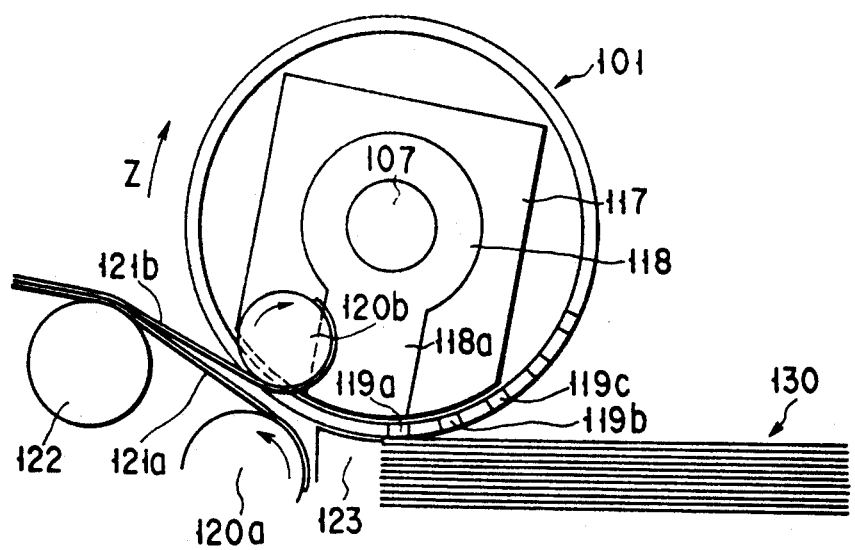
FIGS. 4A to 4C illustrate the operation of feeding sheets by means of a feed rotor.
Figure 4B:
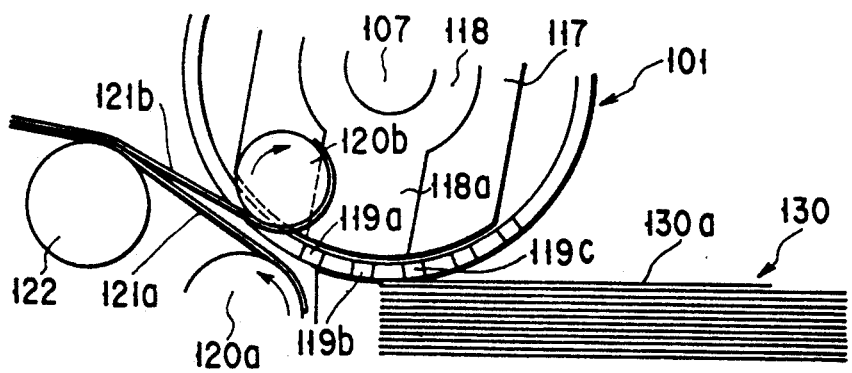
Figure 4C:
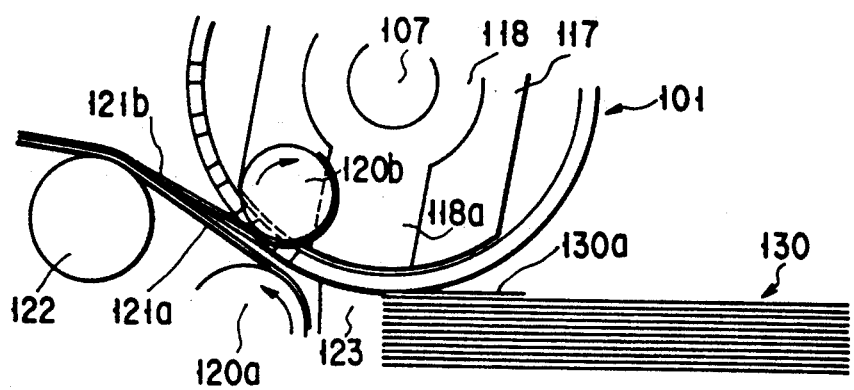

3) The angular velocity (time differentiation of φ) of curve b13 is desirably determined such that the peripheral speed of the rotor 2 a the time of feeding sheets 130 (in FIGS. 4A to 4C) onto convey belts 121a and 121b becomes equal to, or close to, the speed of the convey belts 121 and 121b. Specifically, by equalizing these speeds, jamming of sheets Can be prevented and the feeding operation is surely performed.

In order to realize the intermittent rotational movement of the feed rotor 2 by using the thus designed θ−φ curve, the shape of the non-circular groove 11 of the cam member 5 is determined in the following manner.

If the θ−φ curve, which meets the requirement for necessary characteristic, is determined by the above method, the angular speeds φ1, φ2, φ3 ... φn corresponding to the rotational angles θ1, θ2, θ3 ... θn of the fly wheel 7 are found. The positions of the rollers 12a and 12b of arms 13a and 13b are plotted on the basis of the rotational angle of the crank arm 15, and the plotted positions are connected by a gentle line. Thus, the shape of the non-circular groove 11 can be determined.

An example of the method of forming the noncircular groove 11 is a cut-machining method in which the cam member 5 is cut by a milling machine. In particular, if a numerically-controlled (NC) miling machine or a cut-machining process is employed, the noncircular groove 11 can easily be formed on the basis of computer-generated caliper rule data.

As has been described above, according to the sheet feeding apparatus 1 of the present invention, the cam mechanism 4 is used as movement-converting means, unlike the prior art. The cam mechanism 4 can convert the uniform speed rotational movement of the fly wheel to non-uniform speed rotational movement of the feed rotor 2. This cam mechanism has such a remarkable advantage that the intermittent rotation curve required for sheet feeding ca be freely designed.

For example, if the curve is designed so that the absolute values of maximum and minimum accelerations of the feed rotor 2 are made equal, the noise and vibration of the apparatus can be reduced to a minimum.

In addition, if the curve is designed so that the stop time of the feed rotor 2 is increased as long as possible in the case where the time for a single rotation of the feed rotor 2 is constant, the sheets can be fed more surely.

By using the cam mechanism 4, the pin coupling mechanism can be employed in the movement-converting means (specifically, pin coupling between the rollers 12a and 12b and arms 13a and 13b). Thereby, slide movement of the crank arm 15 can be reduced to a minimum.

A modification of the non-circular groove formed in the cam member is shown in FIGS. 9A and 9B. In FIGS. 9A and 9B, the non-circular groove 20 is line-symmetric, unlike the groove of FIGS. 8A and 8B.

Figure 12:
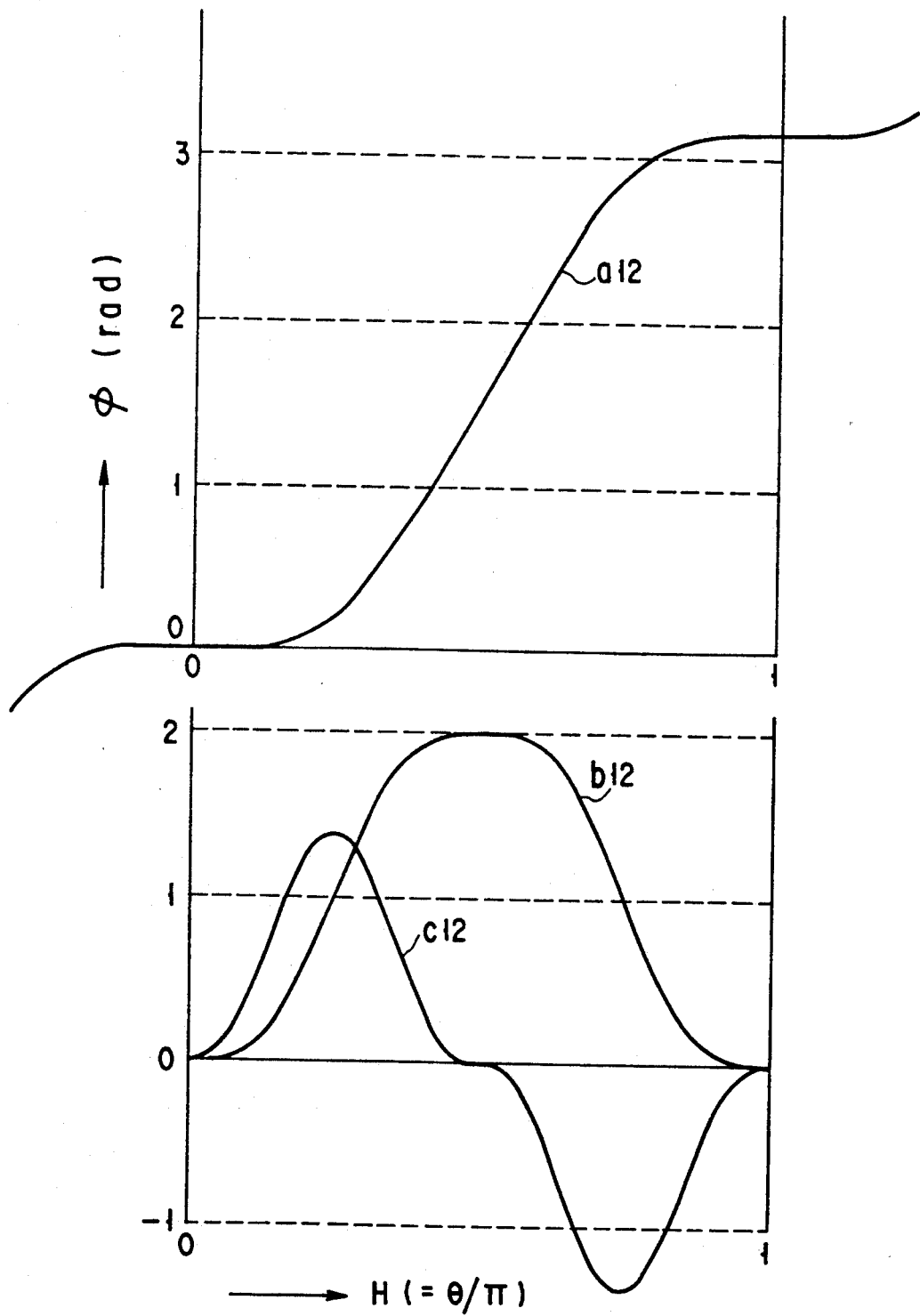
FIG. 12 is a graph showing an example of the relationship between the rotation angle $\theta$ of the fly-wheel and the rotation angle $\phi$ of the feed rotor in the sheet feeding apparatus of the present invention.

FIG. 12 illustrates the relationship in rotational angle between the fly wheel 7 and the feed rotor 2 in the case where the non-circular groove 20 as shown in FIGS. 9A and 9B is formed (the ordinate and abscissa indicate the same as in FIG. 11).

As is clear from FIG. 12, the non-circular groove 20 of FIGS. 9A and 9B is designed such that the peaks of the acceleration of the feed rotor 2 are located nearly at $H=\frac{1}{4}$ and $H=\frac{3}{4}$. The non-circular groove 20 can also be manufactured by the above method. In this case, too, equation (1) is supposed, and the curve is determined by substituting p=3 and q=3 in equation (2).

The curve c13 in FIG. 13 indicates the case where the non-circular groove 20 is formed as shown in FIGS. 9A and 9B. Specifically, if the cam member 5 shown in FIGS. 9A and 9b is adopted, the stop time of the feed rotor 2 is further increased and the sheet can be fed more surely.

A second embodiment of the present invention will now be described with reference to FIGS. 14A and 14B. In the following description of the subsequent embodiments, the same structural parts as in the first embodiment are denoted by like reference numerals, and detailed descriptions thereof are omitted.

A sheet feeding apparatus 2 of the second embodiment, as shown in FIGS. 14A and 14B, differs from the apparatus of the first embodiment in that the apparatus 21 is provided with a cruciform coupling 22 (see FIG. 14B). The coupling 22 is fitted over the center shaft 9, and it is provided with slits 22a, 22b, 22c and 22d at intervals of 90°.

The pins 14a and 14b of arms 13a and 13b are engaged in the slits 22a and 22c of the coupling 22. On the other hand, pins 23a and 23b provided on the crank arm 15 are engaged in the slits 22b and 22d which are each displaced from the slits 22a and 22c by 90°.

According to the second embodiment with the above structure, even if the rotation centers of the pins 14a and 14b are slightly displaced in respect of the center shaft 9, the coupling 22 can cancel such a displacement and transmit driving force to the rotor 2. Accordingly, a load on the arms 13a and 13b is equally divided and the feed rotor 2 can always be rotated smoothly without undesirable load.

A third embodiment of the invention will now be described with reference to FIGS. 15A and 15B. The structure of a sheet feeding apparatus 31 shown in FIGS. 15A and 15B is basically identical to that of the sheet feeding apparatus 21 of the second embodiment., however, the arms 13a and 13b are replaced by more firm arms 32a and 32b.

Figure 15A:
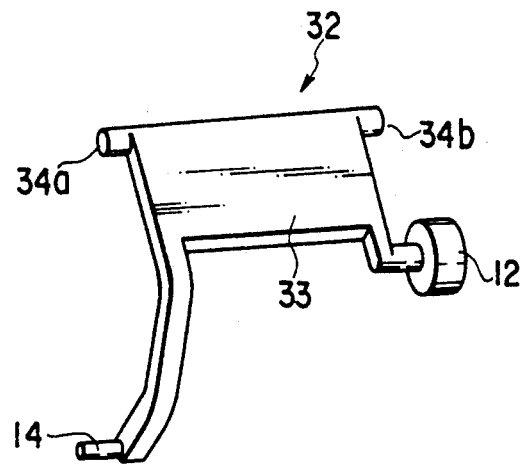
FIGS. 15A and 15B are perspective views showing a sheet feeding apparatus according to a third embodiment of the invention.
Figure 15B:
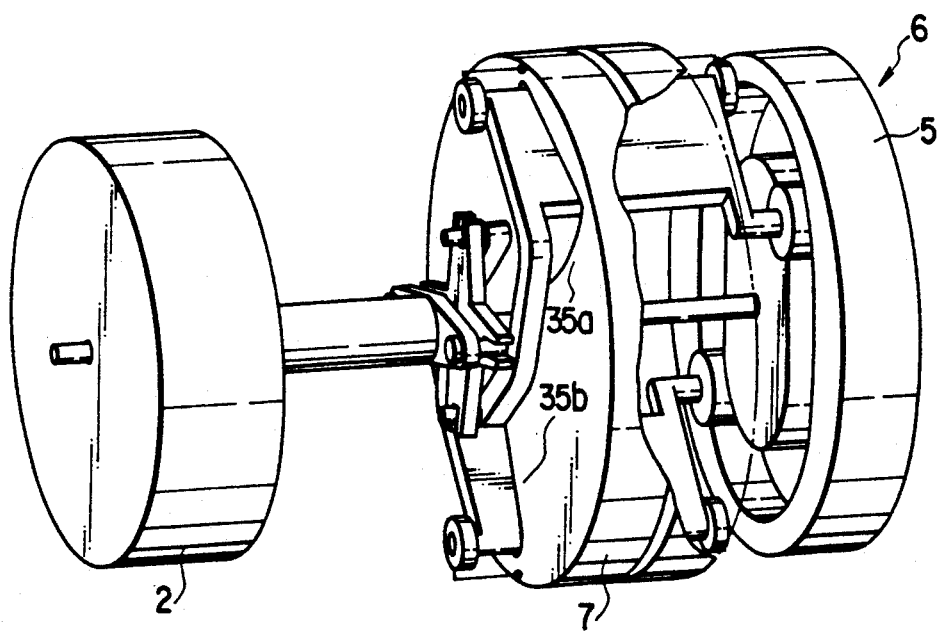

As is shown in FIG. 15A, each arm 32 is provided with a reinforcing portion 33. The rigidity of the arm 32 is high in the direction of applied force. Both end portions of the reinforcing portion 33 are provided with projections 34a and 34b. The arm 32 is rotatably connected to the fly wheel 7 by utilizing the projections 34a and 34b. The fly wheel 7 has large holes 35a and 35b, and the arms 32a and 32b are situated in the holes 35a and 35b.

Where the arms 13a and 13b of the preceding embodiments are used, both end portions of each arm 13a, 13b which are bent 90° receive a great torque due to inertia torque produced by intermittent rotation of the feed rotor 2, when the fly wheel 7 is rotated at high speed, and an excessive torsion torque may act on the center portion of each arm 13a, 13b which supports both end portions of each arm. If the arm 32 of the third embodiment, which has the reinforcing portion 33, is used, breaking of arms due to excessive torsion torque can be prevented.

A fourth embodiment of the invention will now be described with reference to FIGS. 16A and 16B. The structure of a sheet feeding apparatus 41 shown in FIGS. 16A and 16B is basically identical to that of the sheet feeding apparatus 31 of the third embodiment; however, the non-circular groove formed in the cam member has a two-step structure in the fourth embodiment.

Figure 16A:
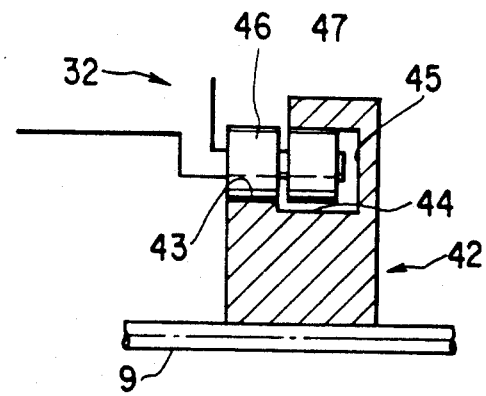
FIGS. 16A and 16B are perspective views showing a sheet feeding apparatus according to a fourth embodiment of the invention.
Figure 16B:
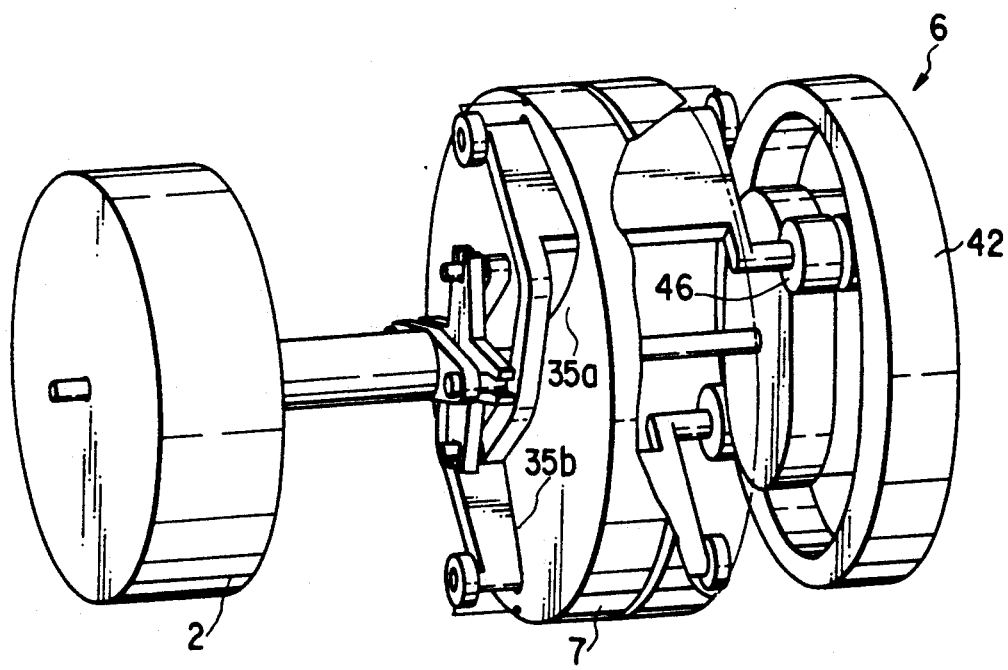

As is shown in FIG. 16A, the cam member 42 of the fourth embodiment has a first groove 43 and a second groove 44 which are formed stepwise along the thickness direction of the cam member 42. The first and second grooves 43 and 44 constitute a non-circular groove 45. Specifically, the inner peripheral side of the first groove 43 and the outer peripheral side of the second groove 44 are formed to have formal cyclic shape, and the outer peripheral side of the first groove 43 and the inner peripheral side of the second groove 44 are formed irrespective of the cyclic shape (in this embodiment the outer periphery of the first groove 43 is a space). Two rollers 46 and 47 (four in total) corresponding to the two grooves 43 and 44 are employed.

Where this cam member 42 is employed, the roller 46 rolls on the inner peripheral side of the first groove 43, and the roller 47 rolls on the outer peripheral side of the second groove 44. The rollers 46 and 47 rotate independently and move along the non-circular groove 45 smoothly. Accordingly, the rollers 46 and 47 roll along the non-circular groove 45, and wear due to sliding friction can be prevented. Thus, wear of the rollers can be reduced to a minimum.

A fifth embodiment of the invention will now be described with reference to FIGS. 17 to 21. In the first to fourth embodiments, for example, in the third embodiment, as shown in FIGS. 15A and 15B, the pin 14 at the distal end of the arm 32 is situated beyond the center shaft 9, when viewed from the position of the rotational shaft 34 of the arm 13 (32). In the fifth embodiment, however, the pin 14 is situated in front of the center shaft 9, as shown in FIG. 17B.

The change in position of the pin 14 means a change in dynamic moment. The change in dynamic moment reduces the force of the roller 12 exerted on a peripheral groove 62 of a cam member 61 according to the fifth embodiment of the invention this will be described later in greater detail).

Figure 17A:
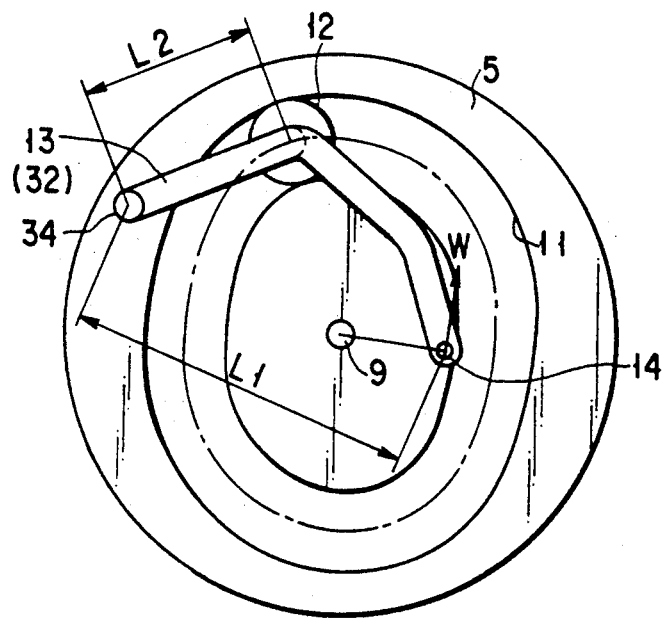
FIGS. 17A and 17B are views for comparing the shapes of the arms and cams of the preceding embodiments and a fifth embodiment of the invention.
Figure 17B:
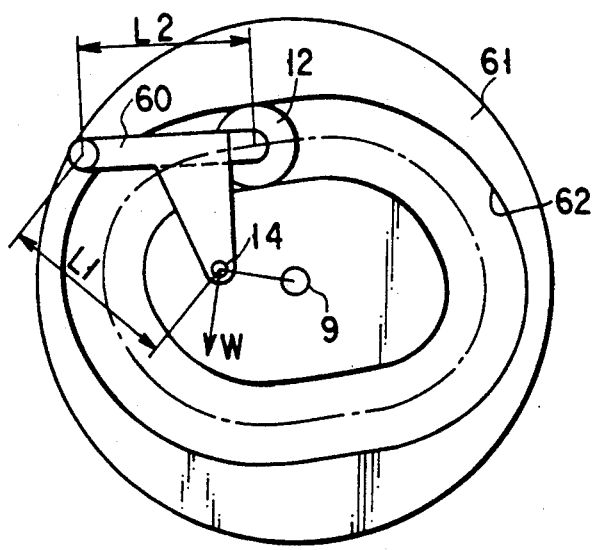
Figure 18A:
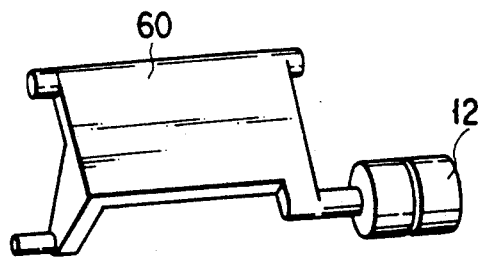
FIGS. 18A and 18B are perspective views showing an arm member of the fifth embodiment and a sheet feeding apparatus in which the arm is employed.
Figure 18B:
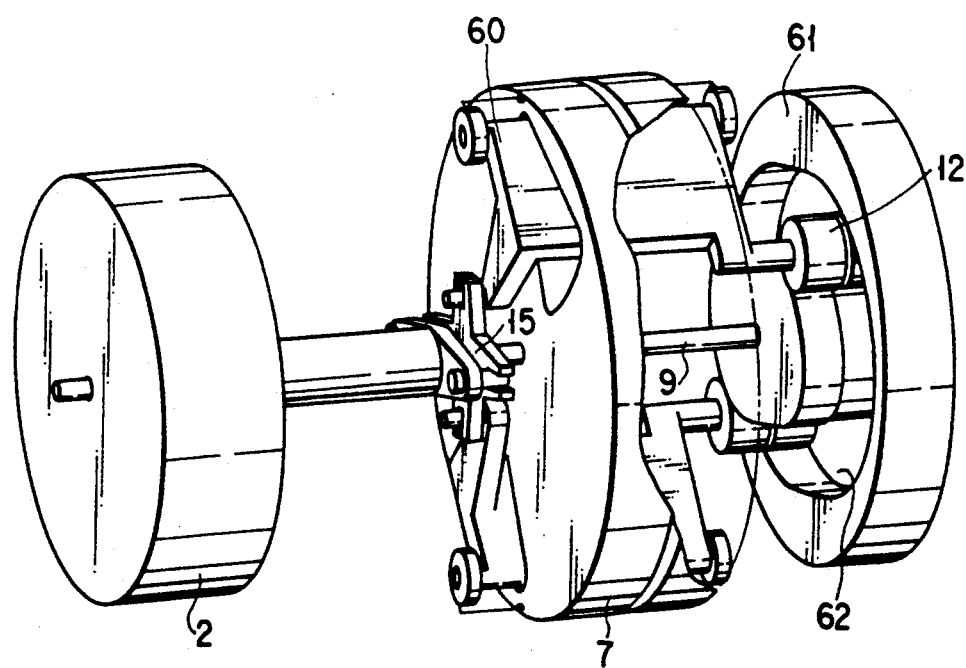

The curved shape of the circumferential groove 62 of the cam member 61 is changed, as shown in FIG. 17B. Thereby, even if the position of the pin 61 is changed, the same speed pattern as shown in FIG. 11 can be obtained. The external appearance of the assembled body according to the fifth embodiment is shown in FIGS. 18A and 18B. All structural elements, but the arm 60 and circumferential groove 62 of the cam member 61, are common to those shown in FIGS. 16A and 16B.

The operation of the fifth embodiment will now be described with reference to FIGS. 19A to 19E. The fly wheel (not shown) rotates and the arm 60 rotates, along with the fly wheel, in the direction of arrow A by 45° to the state of FIG. 19B. At this time, the crank 15 is situated behind the arm 60 by an angle $\underline{m}$. The arm 60 further rotates in the direction of arrow A by 45° to the state of FIG. 19C. In this state, the angle $\underline{m}$ of the arm 60 is zero. At this time the crank 15 catches up with the arm 60, and in FIG. 19D the crank 15 moves farther than the arm 60 by an angle $\underline{m}$. In the following phase shown in FIG. 19E, the angle $\underline{m}$ is zero.

In this manner, the crank 15 rotates with a variation in speed, in relation to the uniform speed rotation of the fly wheel. In the states shown in FIGS. 19A and 19E, the rotational speed is zero.

According to the fifth embodiment, the following advantages can be obtained. That is, the driving torque for rotating the fly wheel can be remarkably reduced, and therefore the power consumed by the motor 3 and the size of the motor can be reduced. In addition, the temperature rise in the motor in operation can be decreased.

Furthermore, the force of the roller 12 exerted on the circumferential groove 62 of the cam member 61 can be reduced. Thereby, an excessive load is not applied to the structural parts (e.g. arm 60, a support for arm 60, roller 12, etc.) of the apparatus. This results in an advantage in structural strength, an increase in operational durability and an improvement in operational noise.

The reduction in driving torque and in force of roller 12 exerted on the circumferential groove 62 of the cam member 61 is advantageous in increasing the operational speed, which is a basic performance of the sheet feeding apparatus. In this case, the load acting on the structural parts increases in proportion to the square of the operational speed. Thus, the operation speed can be increased by a degree corresponding to the reduction in force within a tolerable range of strength, and a higher-speed operation can be performed.

The reason why the driving torque can be reduced and the force of the roller 12 exerted o the circumferential groove 62 of the cam member 61 can be reduced will now be described.

Figure 20A:
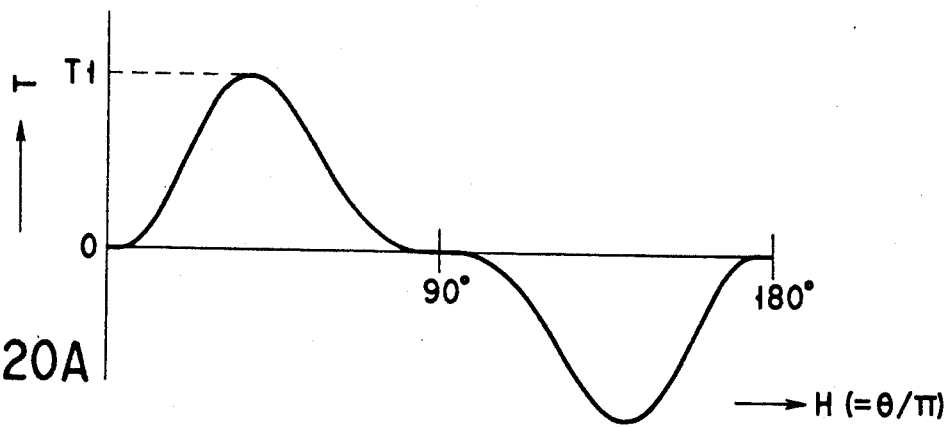
FIGS. 20A and 20B are graphs showing drive torques required to rotate the fly-wheel of the fifth embodiment.

First, the reason for the reduction in driving torque will now be described. A driving torque T necessary for rotating the fly wheel is determined by the inertia due to intermittent rotation of the feed rotor and the cam mechanism 61, as shown in FIG. 20A. In a range of the rotational angle $\theta$ of the fly wheel between 0° and 90°, the torque T takes a positive (+) value; in a range between 90° and 180° the torque T takes a negative (−) value.

In fact, the arm 13 moves in a swinging manner and there is an influence of the inertial of the arm 13 itself. In the preceding embodiments, the inertia of the arm 13 acts counterclockwise in the direction of arrow $\underline{u}$ (in FIG. 10C) in a range of rotational angle of the fly wheel between 0° and 90°, and acts clockwise in the direction of arrow $\underline{v}$ (in FIG. 10E) in a range of rotational angle of the fly wheel between 90° and 180°. Thereby, forces Fa and Fb act at rotational points of the arms 13. Thus, the influence of forces Fa and Fb (in FIG. 20A) is added to the driving torque T required to rotate the fly wheel, and consequently the driving torque T required to rotate the fly wheel increases.

Figure 19C:
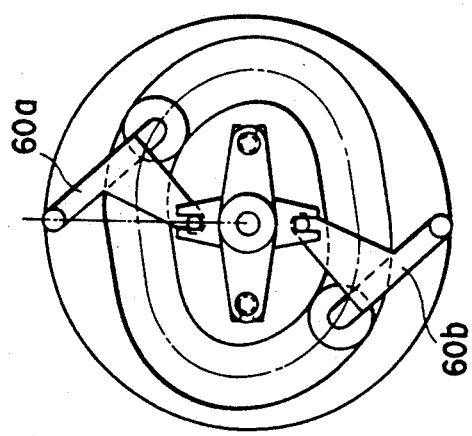
FIGS. 19A to 19E illustrate how the rollers move along the non-circular groove formed in the cam member of the fifth embodiment.
Figure 19B:
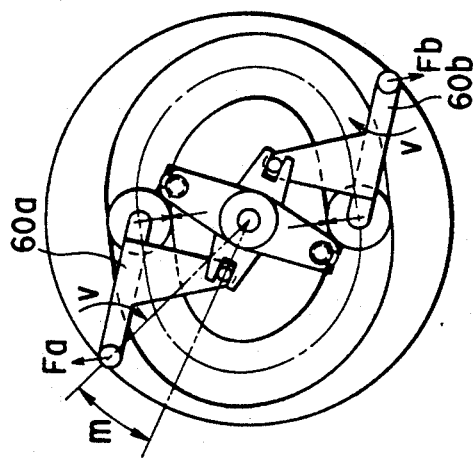
Figure 19E:
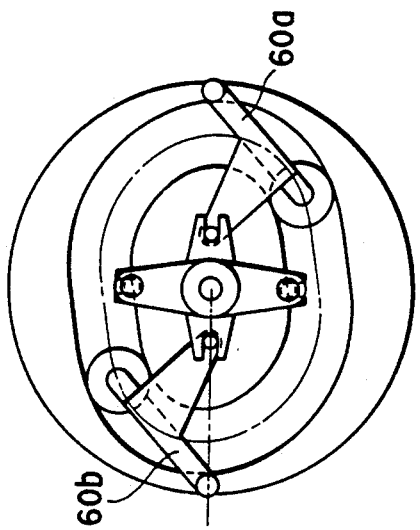
Figure 19A:
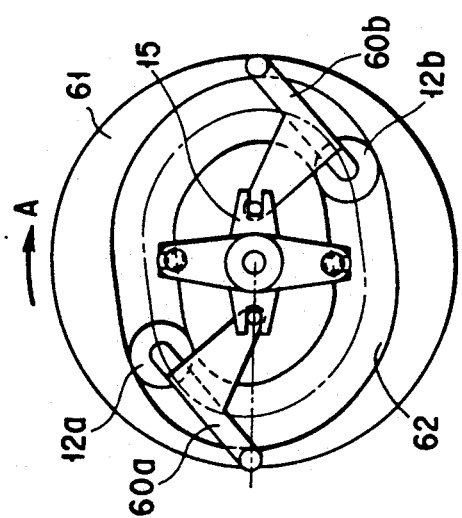
Figure 19D:
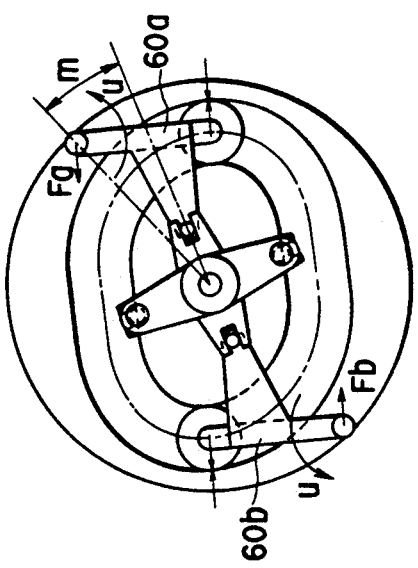
Figure 20B:
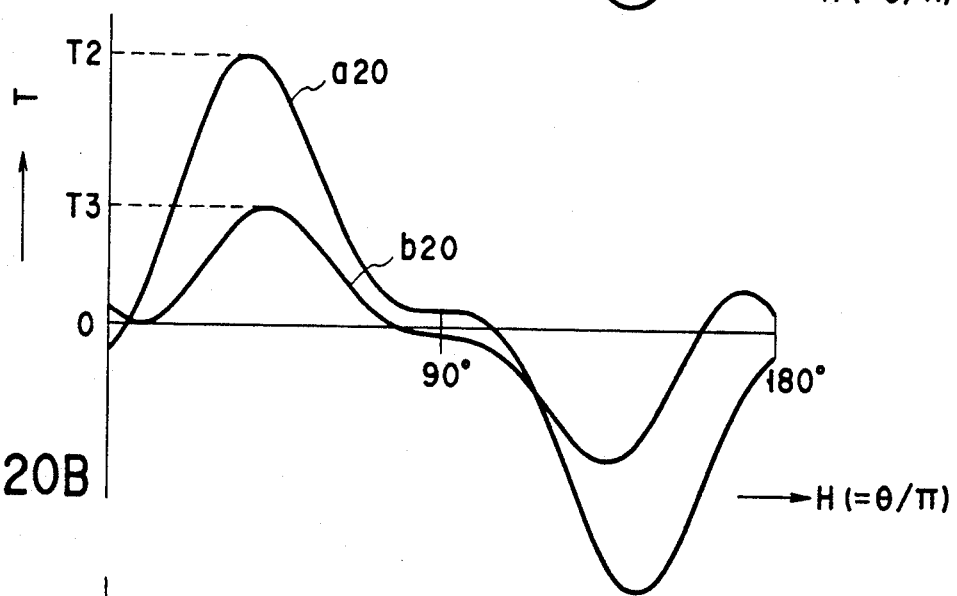

According to the structure of the fifth embodiment of the invention, however, the inertia of the swinging arm 60 acts as a clockwise torque, as shown in FIG. 19B by arrow $\underline{v}$, within a range of rotational angle $\theta$ of the fly wheel between 0° and 90°, and acts counterclockwise, as shown in FIG. 19D by arrow $\underline{u}$, within a range between 90° to 180°. And forces Fa and Fb act at moving points of the arms 13 (60). The forces Fa and Fb act in such a direction as to decrease the driving torque T required to rotate the fly wheel. As a result, the driving torque T required to rotate the fly wheel is expressed by curve a20 in the cases of the first to fourth embodiments, in fact, as shown in FIG. 20B, and not in FIG. 20A, and is expressed by curve b20 in the case of the fifth embodiment. In this case, T1>T3 and the driving torque T is greatly reduced, compared to curve a20.

The reason why the force P of the roller 12 exerted on the peripheral groove 62 of the cam member 61 can be reduced will now be stated. As is shown in FIG. 17A, in the first to fourth embodiments, the distance L1 between the rotational point of the arm 13 and the distal end of the arm 13 is greater than the distance L2 between the rotational point of the arm and the roller, and a load W is increased and exerted on the cam surface. By contrast, in the fifth embodiment shown in FIG. 17B, the distances L1 and L2 are substantially equal, and the load W, which is not increased, is exerted on the cam surface.

Figure 21:
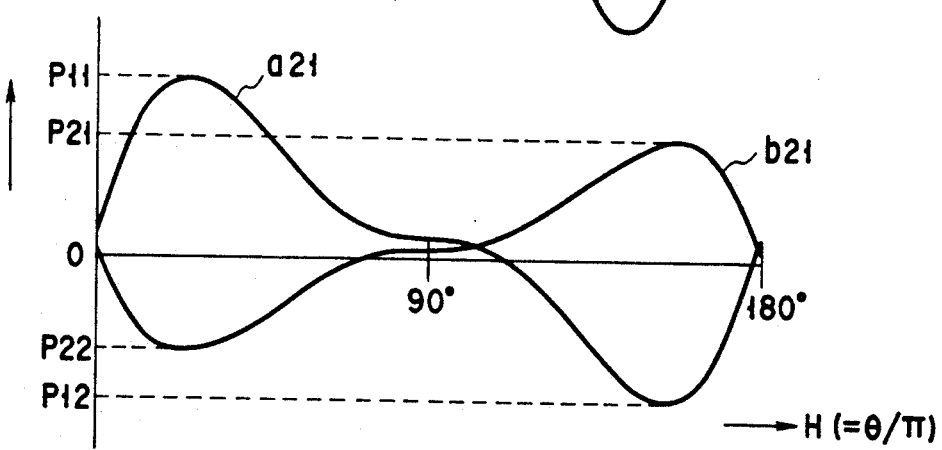
FIG. 21 is a graph showing a force acting on the cam of the present invention.

As a result, as shown in FIG. 21, values P21 and P22 of the curve b21 associated with the fifth embodiment are lower than values P11 and P12 of the curve a21 associated with the first to fourth embodiments.

In FIG. 21, the cam surface pressure P plotted in the ordinate takes a positive (+) value when force acts in the direction in which the roller 12 moves away from the center of the cam member 61, and it takes a negative (−) value when force acts in the direction in which the roller 12 moves towards the center of the cam member 61.

Some embodiments of the present invention have been described above; however, this invention is not limited to these embodiments.

For example, the number of arms for transmitting rotational movement from the cam mechanism to the feed rotor is not limited to two; one arm may be used.

The non-circular groove was formed as an orbit-forming member; however, for example, a cam member having a predetermined outer peripheral shape may be used, so that rollers may roll along the outer periphery of the cam member. In this case, the cam member or the rollers may be formed of a magnet, thereby to prevent the rollers from departing from the outer periphery of the cam member.

The non-circular groove may be filled with a lubricating agent such as grease, or the roller may be formed of a solid lubricating member.

As has been described above, according to the sheet feeding apparatus of the present invention which employs the cam mechanism, the intermittent rotation curve required to feed sheets can be freely designed, noise and vibration of the apparatus can be reduced to a minimum, and sheets can be surely fed out.

FIGS. 22A and 22B are perspective views showing a sheet feeding apparatus according to a sixth embodiment of the present invention. The sheet feeding apparatus 201 comprises a feed rotor 202 for feeding sheets, a motor 203 for driving the feed rotor 202, and a cam mechanism (movement-converting means) 204 for converting uniform speed rotation movement of the motor 203 to intermittent rotation movement of the feed rotor 202. By using the cam mechanism 204, the uniform-speed rotation movement of the motor 203 to intermittent rotation movement (non-uniform speed rotation movement) of the feed rotor 202.

A fly wheel 207 is rotatably provided on a center shaft 207a. A pulley 206 is provided on a motor shaft 203a of the motor 203. An endless belt 8 is passed between the fly wheel 207 and pulley 206. Thereby, the motor 203 can rotate the fly wheel 207 about its center shaft 207a.

In the sixth embodiment the cam mechanism 204 and fly wheel 207 are housed in a casing 205 (indicated by two-dot and-dash lines in FIG. 22A).

A disc 205a is fixed at one end of the casing 205. A cam member 209 is situated adjacent to the disc 205a. The cam member 209 comprises a first cam member 209a and a second cam member 209b. The first cam member 209a is provided at a center region of the cam member 209, and has two outer peripheral annular orbits A and C which run in parallel. On the other hand, the second cam member 209b surrounds the first cam member 209a, and has a circular shape with two inner peripheral annular orbits B and D running in parallel. The width (thickness) of the outer peripheral orbit A is equal to that of the inner peripheral orbit B, and the width (thickness) of the outer peripheral orbit C is equal to that of the inner peripheral orbit D.

A key groove 210a is formed in a side surface of the second cam member 209b. A key 210b fixed to the disc 205a is fitted in the key groove 210a. By virtue of the key groove 210a and key 210b, axial movement of the cam member 209 is allowed, but circumferential movement thereof is not allowed.

Figure 23A:
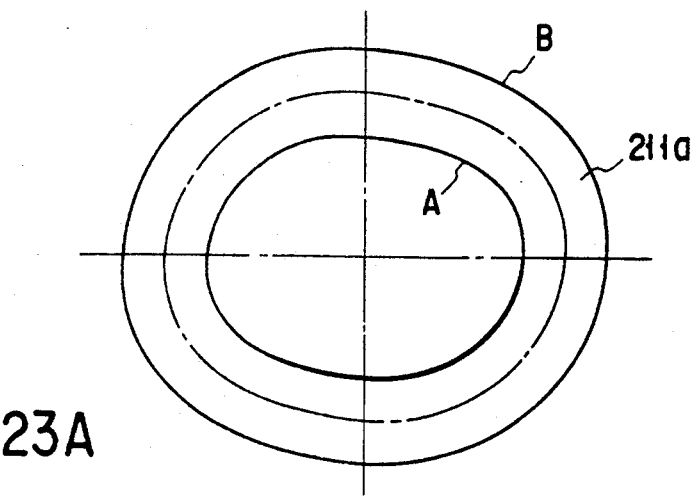
FIGS. 23A to 23C show non-circular grooves of the cam mechanism.
Figure 23B:
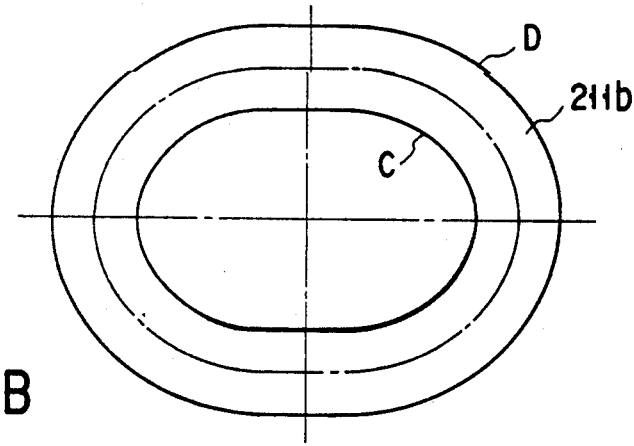
Figure 23C:
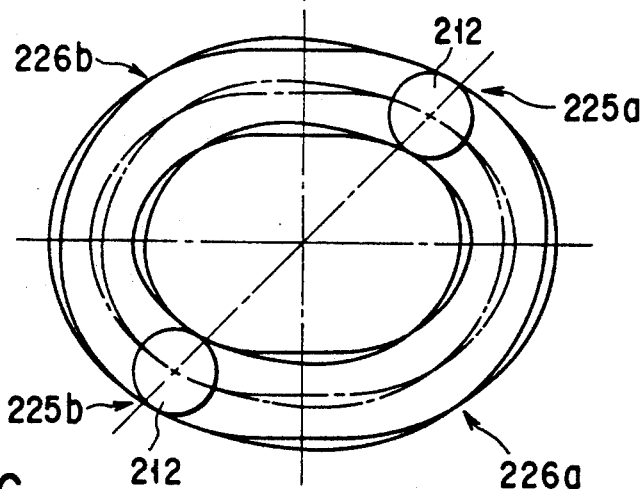

FIGS. 23A to 23C show the outer peripheral orbits A and C and inner peripheral orbits B and D of the cam member 209, as viewed in the direction of arrow X' in FIG. 22A. FIG. 23A shows a non-circular groove 211a defined by the outer peripheral orbit A and inner peripheral orbit B, and FIG. 23B shows a non-circular groove 211b defined by the outer peripheral orbit C and inner peripheral orbit D. FIG. 23C is a see-through view showing the non-circular grooves 211a and 211b which are overlapped on each other. The non-circular groove 211a is formed in a non-line-symmetric shape, while the non-circular groove 211b is formed in a line-symmetric manner. The non-circular grooves 211a and 211b are formed, supposing that rollers (rolling members) 212 (described later) are revolved clockwise in respect of the sheet surface of FIG. 23A As is shown in FIGS. 22 and 24, the rollers 212 are a pair of rollers 212a and 212b which are independently rotatable and coupled (pin-coupled) to one end portion of each of arms 213 (213a, 213b) serving as movement-transmission members. The rollers 212a and 212b are distanced by 180° in respect of the centers of the non-circular grooves 211a and 211b (see FIG. 23C).

Figure 26A:
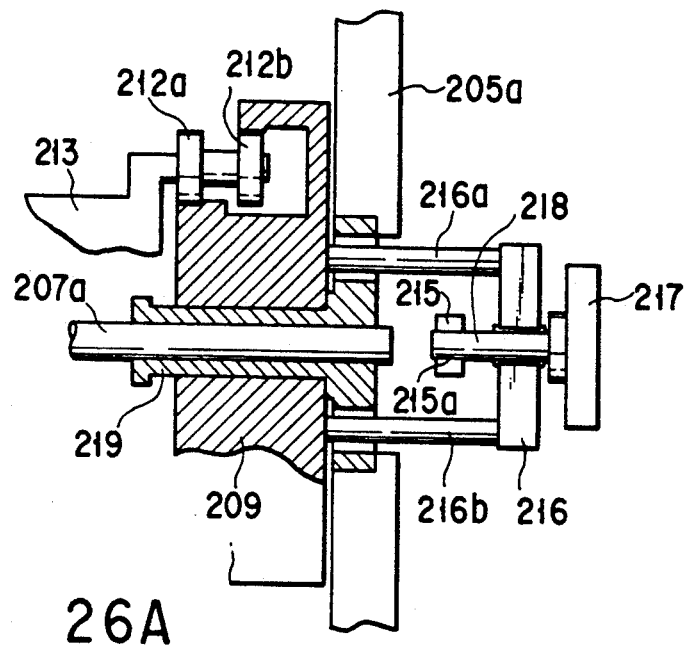
FIGS. 26A and 26B are cross-sectional views showing those parts of the sheet feeding apparatus of the sixth embodiment, which are arranged near the disc.
Figure 26B:
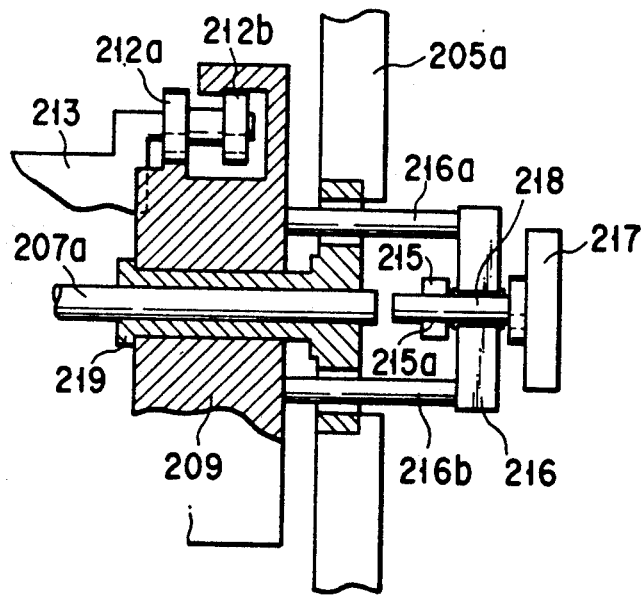

The rollers 212a and 212b are kept at a predetermined distance from each other, such that when the roller 212a faces the outer peripheral orbit A, the roller 212b faces the inner peripheral orbit B, and when the roller 212a faces the outer peripheral orbit C, the roller 212b faces the inner peripheral orbit D (see FIGS. 26A and 26B).

As is shown in FIG. 24, the arm 213 has a thick center portion so that its rigidity may be high in the direction of applied force (rotational direction). The arm 213 penetrates a hole 207b in the fly wheel 207. Projections 214a and 214b are formed at both ends of the arm 213. The arm 213 is rotatably connected to the fly wheel 207 by means of the projections 214a and 214b.

Figure 25:
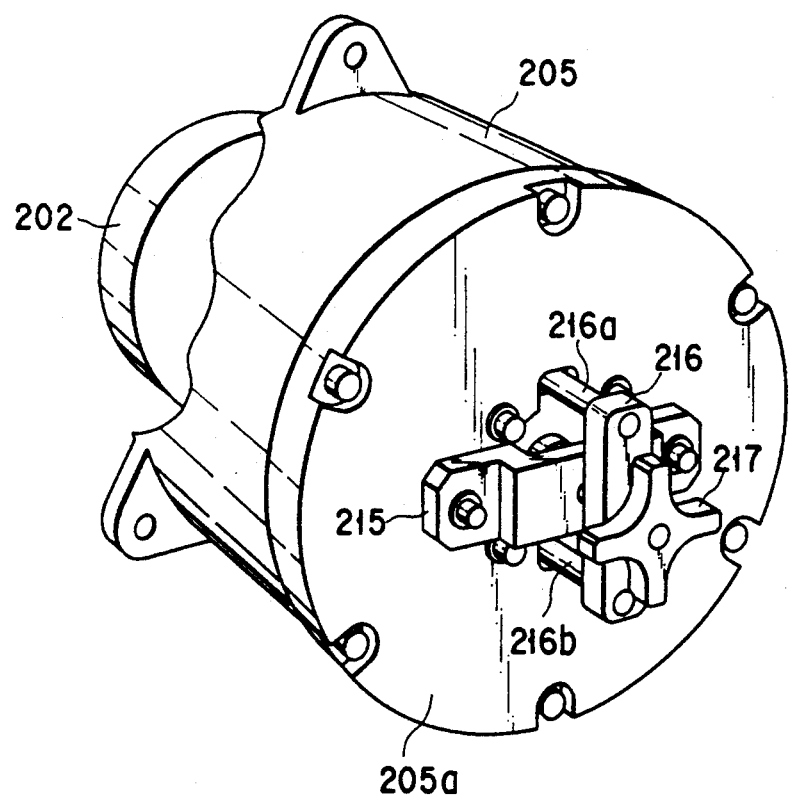
FIG. 25 is a perspective view of a sheet feeding apparatus according to a sixth embodiment of the invention, as from the disc side.

FIG. 25 is a perspective view showing the casing 205, as viewed from the disc (205) side. FIGS. 26A and 26B are cross-sectional views showing those portions of the casing 205, which are situated near the disc 205a.

A clamp bracket 215, a shift plate 216 and a handle 217 are arranged, in this order, on the side surface of the disc 205a. The clamp bracket 215 is fixed to the disc 205a of the casing 205. A screw groove 215a is formed at a center portion of the clamp bracket 215. A screw shaft 218 is engaged in the screw groove 215a. An end portion of the screw shaft 218 is connected to the handle 217.

A screw groove is not formed in the shift plate 216 situated between the clamp bracket 21 and the handle 217. The screw shaft is passed through the shift plate 216. The screw shaft 218 cannot move axially in relation to the shift plate 216. Accordingly, even if the handle 217 is operated to rotate the screw shaft 218, the distance between the shift plate 216 and the handle 217 is kept constant.

Studs 216a and 216b are formed on the shift plate 216. Distal end portions of the studs 216a and 216b are passed through a member 219 and fixed to the second cam member 209b. The member 219 is fixed to the disc 205a and firmly holds one end of the center shaft 207a of the fly wheel 207a. The first cam member 209a is slidably fitted on the member 219.

A cruciform coupling 222 (see FIG. 22B) is provided on the side face of the fly wheel 207 such that the coupling 222 is fitted on the center shaft 207a. The coupling 222 has four slits 222a, 222b, 222c and 222d distanced at intervals of 90°. Pins 255a and 255b formed on the arms 213a and 213b are fitted in the sits 222a and 222b of the coupling 222.

On the other hand, a crank arm 223 is situated between the coupling 222 and the feed rotor 202. The crank arm 223 has pins 223a and 223b which are fitted in the slits 222b and 222d of the coupling 222. The crank arm 223 is fixed to a cylindrical member 224 to couple the cylindrical member 224 and the rotor 202. The center shaft 207a is inserted through the cylindrical member 224. The crank arm 223 is concentric with the center shaft 207a.

FIGS. 27A to 27E illustrate the relationship between the non-circular groove 211b and rollers 212 when the fly wheel 207 is rotated. In these figures, the arms 213a and 213b are rotated about the center shaft 207a in units of 45°. FIGS. 27A to 27E show the coupling 222 and crank arm 223 in a see-through manner.

The fly wheel 207 is rotated in the direction of arrow Y' from the state of FIG. 27A. When the state of FIG. 27A has shifted to that of FIG. 27B, the crank arm 223 rotates only slightly, as compared to the rotation amount (45°) of the arms 213a and 213b.

Inversely, when the state of FIG. 27B has shifted to that of FIG. 27D, the rotation amount of the crank arm 223 is greater than that of the arms 213a and 213b.

When the state of FIG. 27D has shifted to that of FIG. 27E, the crank arm 223 rotates only slightly, as in the state of FIG. 27B shifted from the state of FIG. 27A, whereas the arms 213a and 213b further rotate 45°, thus returning to the original state (FIG. 27A).

The relationship in rotation amount between the arms 213a and 213b and the crank arm 223, that is, between the fly wheel 207 and the feed rotor 202, can be freely determined by the method of designing the non-circular grooves 211a and 211b formed by the outer peripheral orbits A and C of the first cam member 209a and the inner peripheral orbits B and D of the second cam member 209b.

For example, in the case of the non-circular groove 211a shown in FIG. 23A, the relationship in rotation amount between the fly wheel 207 and the feed rotor 202 is determined as shown in FIG. 28. On the other hand, in the case of the non-circular groove 211b shown in FIG. 23B, the relationship in rotation amount between the fly wheel 207 and the feed rotor 202 is determined as shown in FIG. 29. The abscissa indicates $\theta/\pi$ (=H) or the input angle obtained by expressing the rotational angle of the fly wheel 207 in a dimensionless manner. On the other hand, the ordinate indicates $\phi$ or the rotational angle of the feed rotor 202 associated with sheet feeding. When the non-circular groove 211b is employed, the rotation speed of the fly wheel 207 is made slightly lower than in the case of using the non-circular groove 211a in order to make sheets match the speed of the convey belt. Accordingly, the scale of the abscissa is greater in FIG. 29 than in FIG. 28. The non-circular groove 211a can be designed in the same procedure as in the first embodiment.

On the other hand, the non-circular groove 211b shown in FIG. 23B is designed so that peaks of acceleration of the feed rotor 2 appear nearly at $H=\frac{1}{4}$ and $H=\frac{3}{4}$. This non-circular groove 211b can also be manufactured by the above design method. In this case, too, equation (1) is supposed, and p=3 and q=3 are substituted in equation (2), thereby obtaining the equation of curve.

Figure 30:
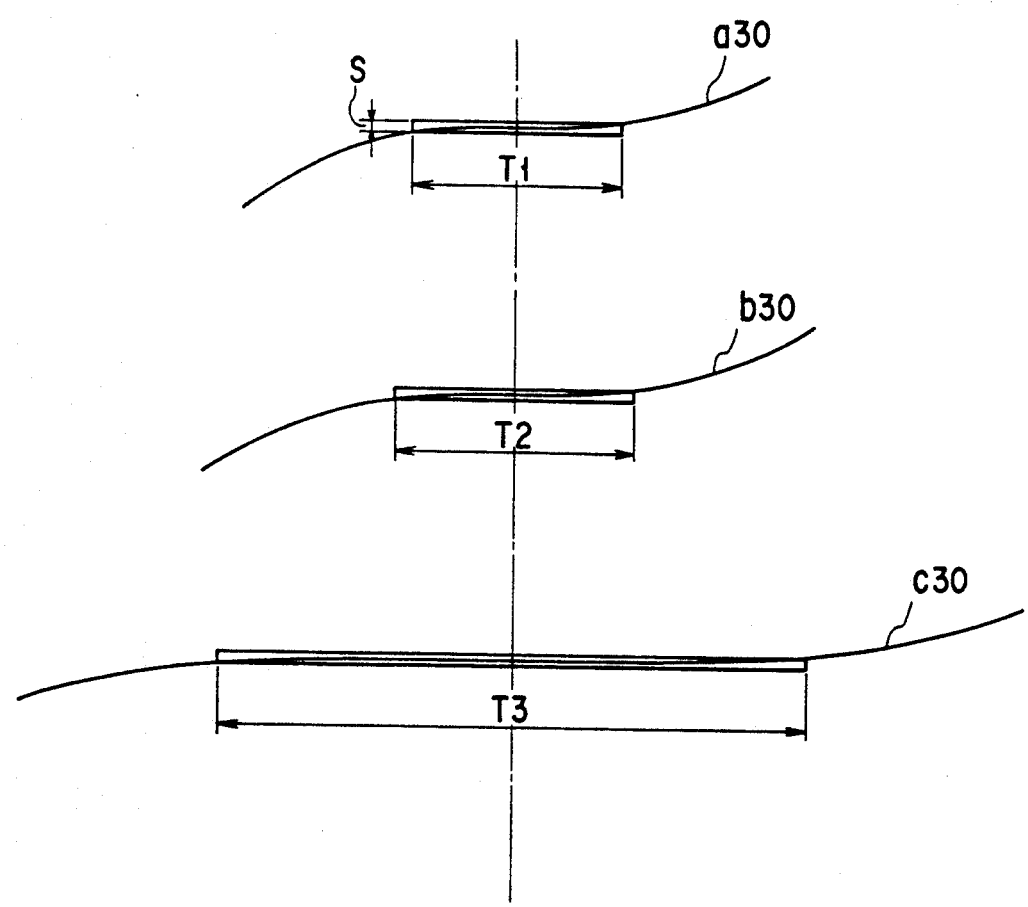
FIG. 30 is a view for comparing the stop states of the feed rotor, by using the rotation angle $\theta$ of the feed rotor.

A curve c30 in FIG. 30 indicates the case of forming the non-circular groove 211b, as shown in FIG. 23B. Specifically, if the non-circular groove 211b is adopted, the stop time of the feed rotor 202 is further increased, and the sheet can be fed out more surely.

In an example of the method of forming the non-circular groove 211, the first cam member 209a and second cam member 209b are cut by a milling machine, and the outer peripheral orbits A and C and inner peripheral orbits B and D are formed. In particular, if a numerically-controlled (NC) milling machine is employed, complex non-circular groove 211 can easily be formed on the basis of computer generated caliper rule data.

Next, the method of switching the non-circular grooves 211a and 211b for rolling the rollers 212a and 213b will now be described with reference to FIGS. 26A and 26B.

FIG. 26A shows the state in which the cam member 209 and disc 205a are closest to each other, which corresponds to the state of FIG. 22A. When the handle 217 is rotated in this state, the crank bracket 215 approaches the shift plate 216. Simultaneously, the studs 216a and 216b move, and the cam member 209 moves away from the disc 205a. Finally, the cam member 209 moves to the position shown in FIG. 26B. FIG. 31 is a perspective view showing the state of FIG. 26B. If the handle 217 is rotated reversely, the position of the second cam member 209b from the state of FIG. 26B to that of FIG. 26A.

In the state of FIG. 26A, the roller 212a can roll on the outer peripheral orbit A and the roller 212b can roll on the inner peripheral orbit C. In the state of FIG. 26B, the roller 212a can roll on the outer peripheral orbit B and the roller 212b can roll on the inner peripheral orbit D. Thus, by rotating the handle 217, the non-circular grooves 211a and 211b which are to be in contact with the rollers 212a and 212b can freely selected.

As is shown in FIG. 23C, the non-circular grooves 211a and 211b have four intersections 225a, 225b, 226a and 226b. Only when the rollers 212 are located at the intersections 225a and 225b or intersections 226a and 226b, the rollers 212 can move in the axial direction of the cam mechanism and the non-circular grooves 211a and 211b can be switched. Since the intersections 225a and 225b have a longer distance of intersection than intersections 226a and 226b, it is desirable to use the intersections 225a and 225b in switching the non-circular grooves 211a and 211b. The rollers 212 can shift more easily at intersections 225a and 225b. (In FIGS. 26A and 26B, for easy understanding of the invention, stepped portions are formed between the outer peripheral orbits A and C and between inner peripheral orbits B and D. In fact, no stepped portions appear since the rollers 212 are located at intersections 225 in FIGS. 26A and 26B.)

As has been described above, according to the sheet feeding apparatus of this invention, the cam mechanism is employed as movement-converting means and therefore the intermittent rotation curve required for sheet feeding can be freely designed.

Figure 2:
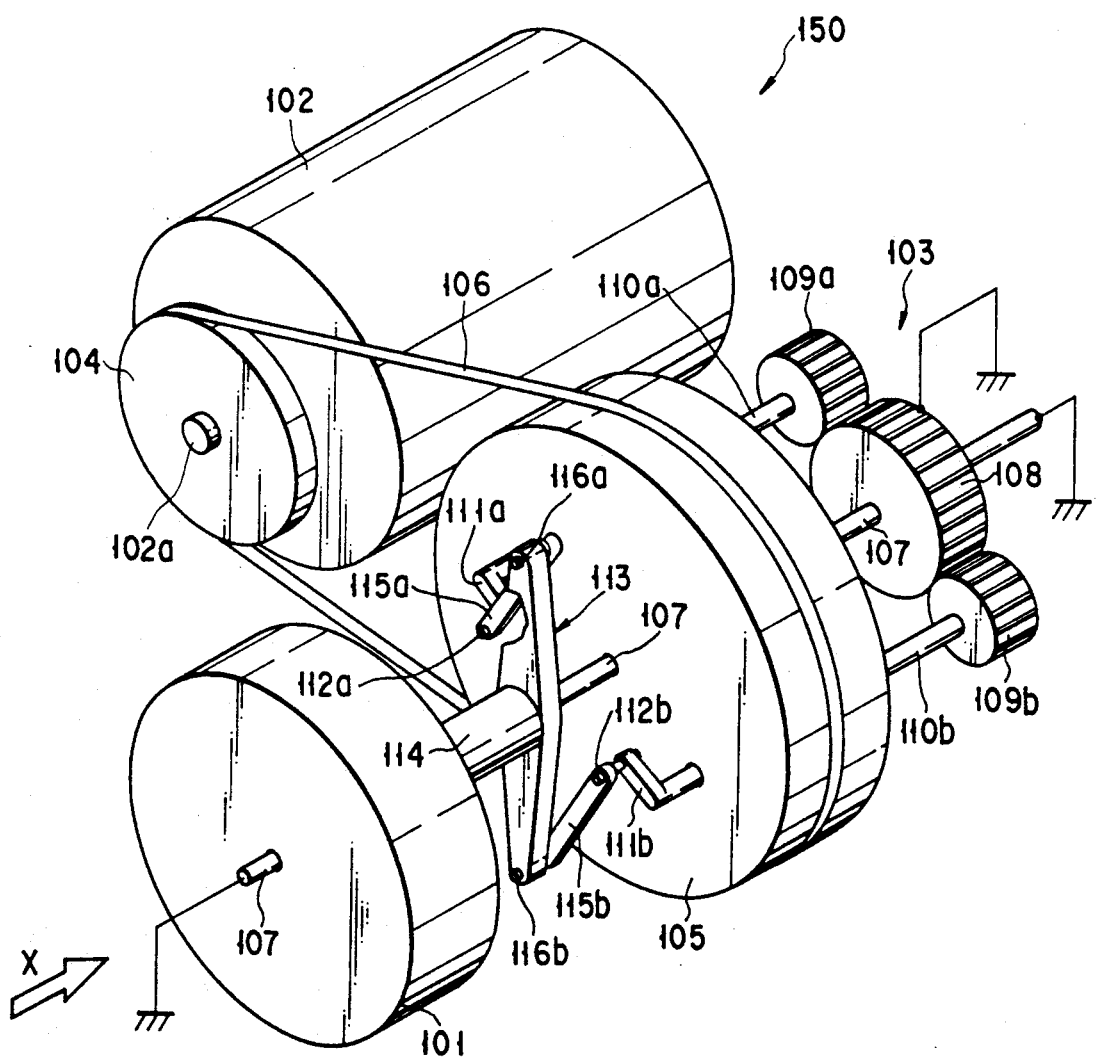
FIG. 2 is a perspective view showing second prior art of the sheet feeding apparatus.
Figure 3A:
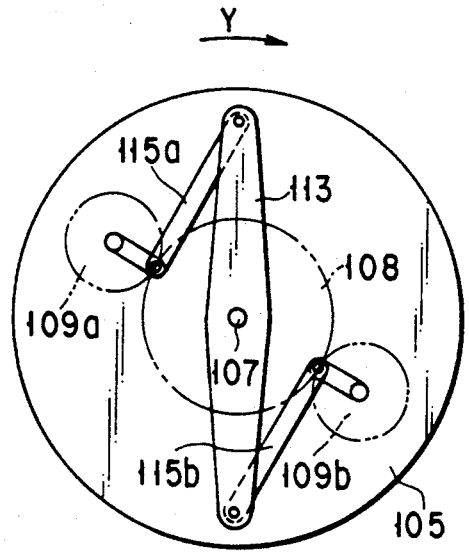
FIGS. 3A to 3D illustrate the operation of the epicyclic gear mechanism provided in the conventional sheet feeding apparatus.
Figure 3B:
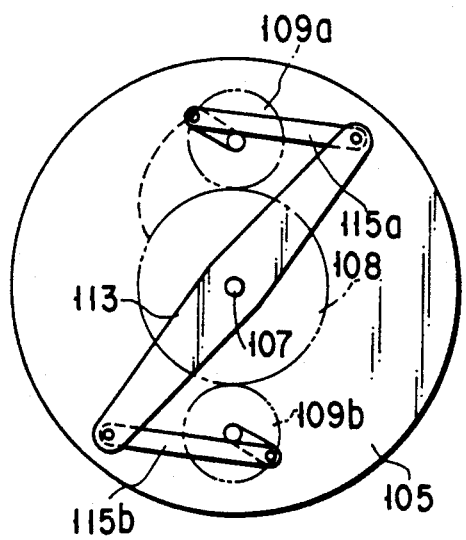
Figure 3C:
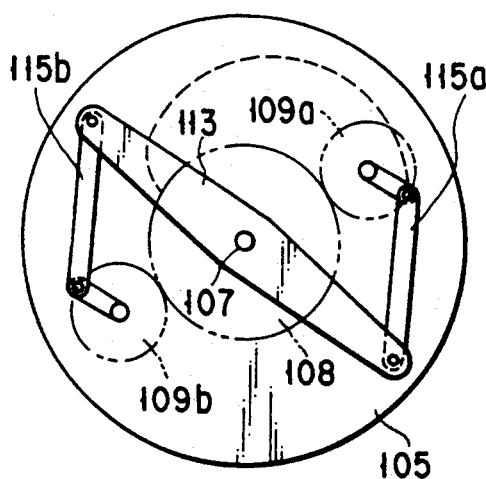
Figure 3D:
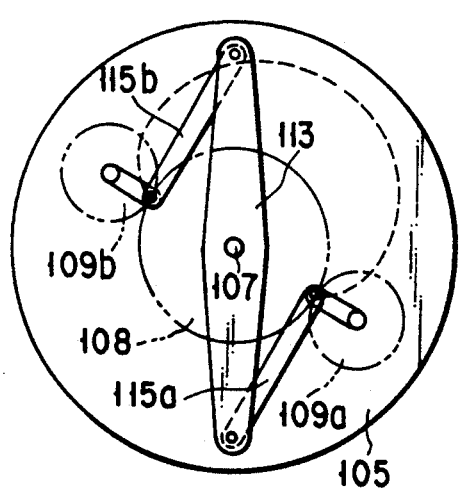

In addition, according to this method, since the conrod in the mechanism of FIG. 2 is not used, it is possible to prevent a difference from occurring between absolute values of rotary acceleration of the feed rotor, and to prevent noise and vibration from occurring. Since no gears are employed, there is no friction of gear surfaces, thereby increasing the life of the apparatus.

The cam mechanism has a plurality of non-circular grooves so that the mode of non-uniform speed rotational movement can be selected. Thus, the rotation mode of the feed rotor can be selected, depending on the condition of sheets to be fed, e.g. new sheets and damaged (old) sheets. Damaged sheets may be fed with a longer stop time of the feed rotor, than new sheets, for careful feeding of sheets (a priority is given to the feeding performance). In this case, it is desirable, in consideration of characteristics of the apparatus, to provide a non-circular groove for giving a priority to the feeding performance, and a non-circular groove for giving a priority to the feeding speed.

Furthermore, it is easy to design such a curve as to equalize the absolute values of the maximum and minimum acceleration speeds of the feed rotor. Accordingly, by decreasing the absolute value of the angular speed of deceleration of intermittent rotational movement of the feed rotor, the inertia load torque is reduced and the occurrence of noise and vibration of the apparatus can be reduced to a minimum.

A seventh embodiment of the invention will now be described with reference to FIGS. 32, 33A and 33B. In the following embodiments, the same structural elements as in the sixth embodiment are denoted by like reference numerals, and detailed descriptions thereof are omitted.

Figure 32:
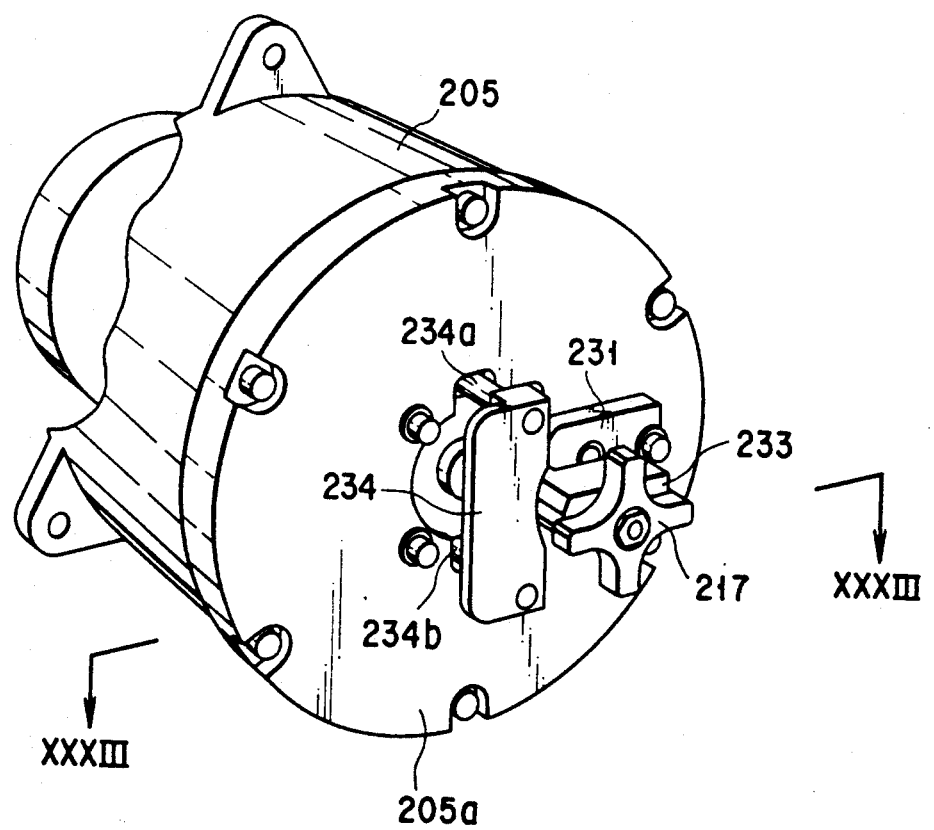
FIG. 32 is a perspective view showing a sheet feeding apparatus according to a seventh embodiment of the invention.

FIG. 32 is a perspective view of the casing 205, as viewed from the disc (205a) side. FIGS. 33a and 33b are cross-sectional views of parts in the vicinity of the disc 205a of the casing 205 shown in FIG. 32.

The seventh embodiment differs from the sixth embodiment in that the cam member 209 is not moved totally mechanically, but is moved partially manually.

A clamp bracket 231 is fixed to the side surface of the disc 205a, and a screw groove 231a is formed at part of the clamp bracket 231. One end portion of a clamp shaft 232 is engaged in the screw groove 231a, and the other end portion of the clamp shaft 232 is coupled to the handle 217. A screw groove is not formed in a clamp arm 233 situated between the clamp bracket 231 and the handle 217 and the clamp shaft 232 is passed through the clamp arm 233. The axial movement of the camp shaft 232 relative to the clamp arm 233 is restricted. Thus, when the clamp shaft 232 is rotated by the handle 217, the distance between the clamp arm 233 and the handle 217 is kept constant. The clamp arm 233 can be rotated manually about the clamp shaft 232, and a projection 233a and a push portion 233b are formed at parts of the clamp arm 233.

The side face of the disc 205a is provided with a shift handle 234. The shift handle 234 has studs 234a and 234b (not shown in FIGS. 33A and 33B), and end portions of the studs 234a and 234b are fixed to the cam member 209.

In connection with the seventh embodiment with this structure, the method of switching the non-circular grooves 211 for rolling the rollers 212 will now be described.

Figure 33A:
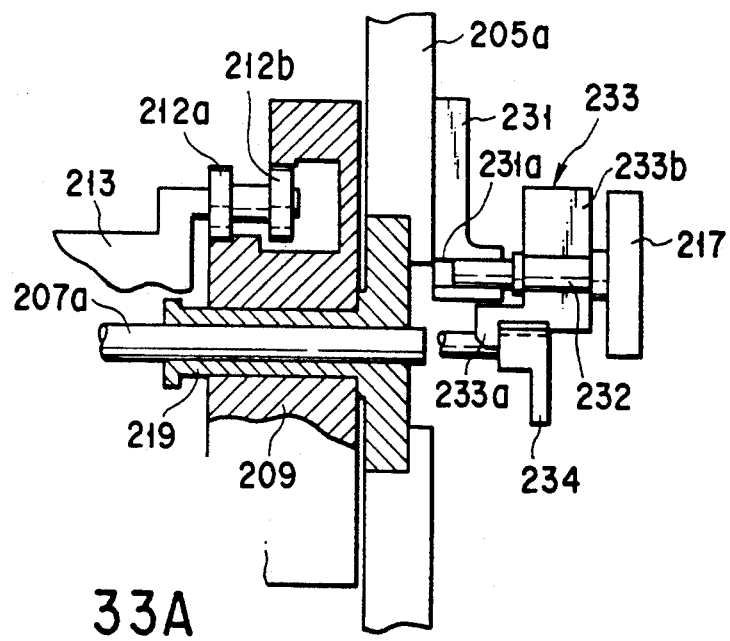
FIGS. 33A and 33B are cross-sectional views taken along line XXXIII—XXXIII in FIG. 32.
Figure 33B:
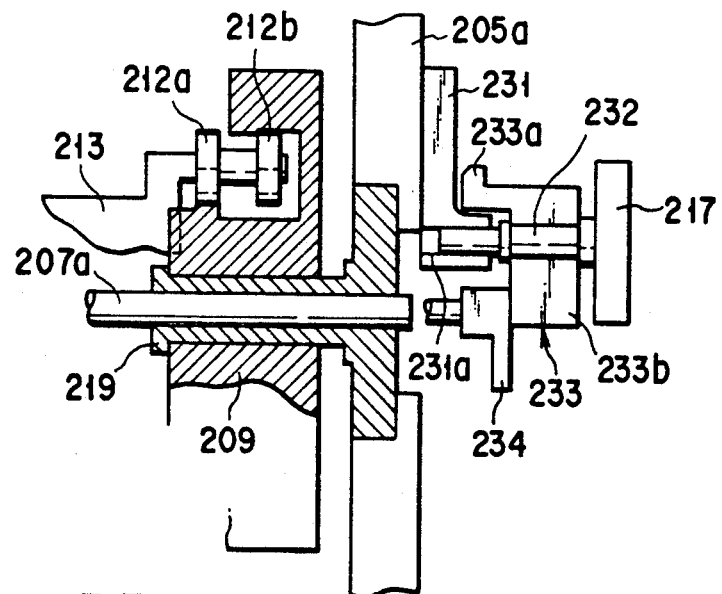

FIG. 33A shows the state in which the cam member 209 is closest to the disc 205a. In FIG. 33A, the projection 233a of the clamp arm 233 engages the shift handle 234, and the projection 234 clamped by the shift handle 234.

On the other hand, for exchanging a cam mechanism when the shift handle 234 is shifted to the left (on the surface of the figure), the clamp is loosed by the right rotation of handle 217, the clamp arm 233 is rotated from the state of FIG. 33A, and the engagement between the projection 233a and shift handle 234 is released. When the clamp arm 233 has been rotated slightly (about 90°), the shift handle 234 is pushed manually to the left (on the surface of the figure), and exchanged to the cam mechanism. When the clamp arm 233 has been 90°, too, the push portion 233b of the clamp arm 233 is put in contact with the shift handle 234. If the handle 217 is rightly rotated in this state, a pushing force is exerted to the shift handle 234 via the push portion 233b, and the shift handle 234 can be moved to the left (on the surface of FIG. 33B), as shown in FIG. 33B. Accordingly, the cam member 209 is pushed by the studs 234a and 234b formed on the shift handle 234, and the cam member 209 exchanges.

If the above process is performed in the reverse order, the cam member 209 can be approached to the disc 305a once again, and cam member 209 exchanges.

An eighth embodiment of the invention will now be described with reference to FIGS. 34, 35 and 36A to 36C.

Figure 35:
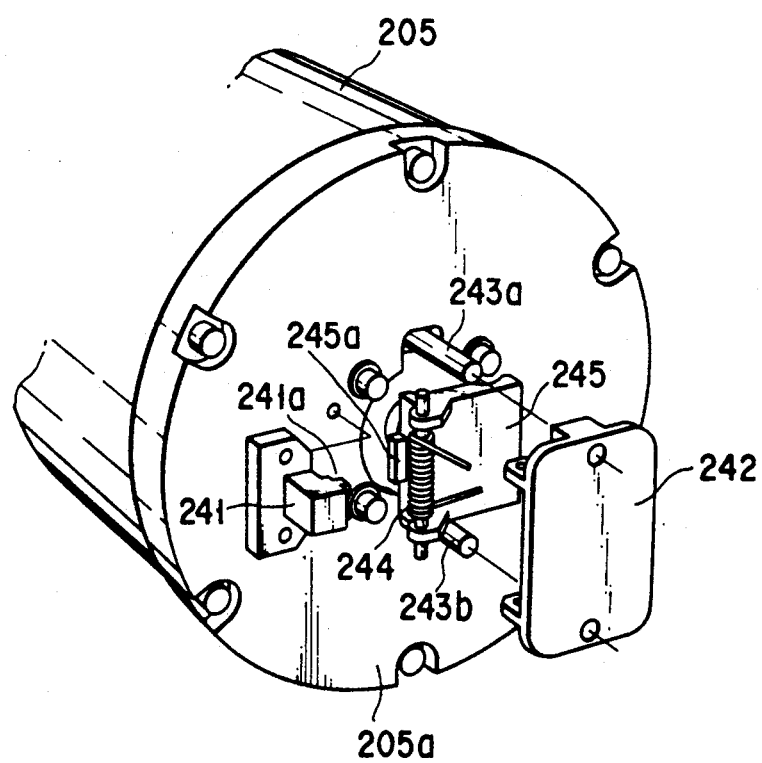
FIG. 35 is an exploded perspective view showing the sheet feeding apparatus according to the eighth embodiment.
Figure 36A:
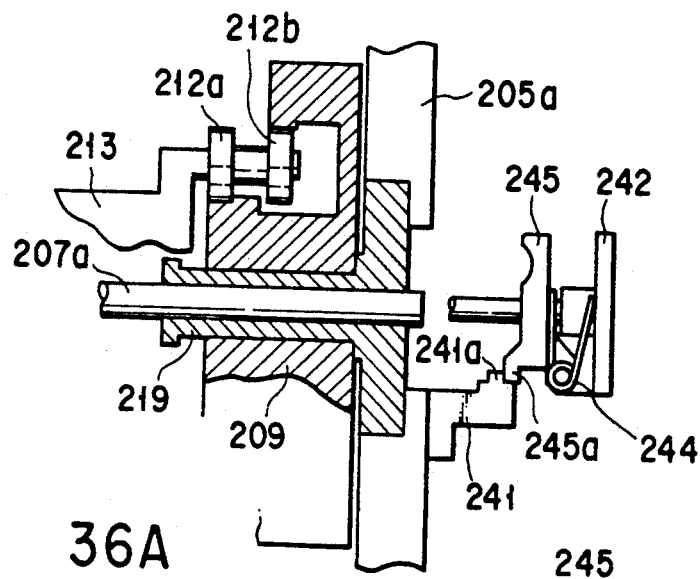
FIGS. 36A to 36C are cross-sectional views taken along lines XXXVI—XXXVI in FIG. 34.
Figure 36B:
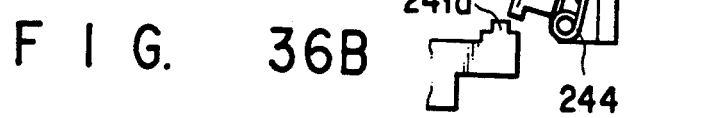
Figure 36C:
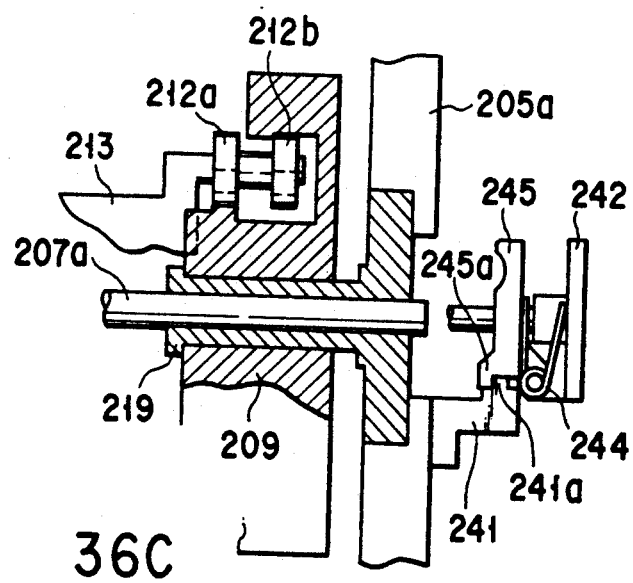

FIG. 34 is a perspective view of the casing 205, as viewed from the disc (205a) side, FIG. 35 is an exploded perspective view of the casing 205, and FIGS. 36A to 36C are cross-sectional views of parts of the casing 205 in the vicinity of the disc 305a shown in FIG. 34.

The eighth embodiment differs from the sixth embodiment, in that the cam member 209 is moved totally manually.

A stopper 241 is fixed to the side face of the disc 205a. The stopper 241 is provided with a projection 241a. Similarly, a shift handle 242 is provided on the side face of the disc 205a. The shift handle 242 has studs 243a and 243b (not shown in FIGS. 36A to 36C, and end portions of the studs 243a and 243b are fixed to the cam member 209. A lever 245 is connected via a spring 244 to that portion of the shift handle 242, which is situated on the disc (205a) side. The lever 245 has a projection 245a.

In connection with the eighth embodiment with this structure, the method of switching the non-circular grooves 211 for rolling the roller 212 will now be described.

FIG. 36A shows the state in which the cam member 209 is closest to the disc 205a. In FIG. 36A, the right side of the projection 241a of the stopper 241 is engaged with the projection 245a of the lever 245, and movement of the shift handle 242 to the left (on the surface of FIG. 36) is restricted.

In order to move the shift handle 242 to the left (on the surface of FIG. 36), the lever 245 is manually pressed, as shown in FIG. 36B, thereby applying a force against the force of spring 244. The lever 245 is lifted until the projection 245a of the lever 245 does not interfere with the projection 241a of the stopper 241. Then, the shift handle 242 is manually pushed to the left (on the surface of the figure) from the state of FIG. 36B. The cam member 209 is pressed by the studs 243a and 243b formed on the shift handle 242, whereby the cam member 209 is separated from the disc 205a. By engaging the left side of the projection 241a of the stopper 241 with the projection 245a of the lever 245, the movement of the shift handle 242 to the right (on the surface of the figure) is restricted.

If the above process is performed in the reverse order, the cam member 209 is changed from the state of FIG. 36C to that of FIG. 36A.

Although some embodiments of the present invention have been described, this invention is not limited to these embodiments.

For example, the number of arms for transmitting rotational movement from the cam mechanism to the rotor is not limited to two; the number may be one, four, etc. The number of non-circular grooves for non-uniform speed rotational movement is not limited, if it is two or more.

The non-circular groove may be filled with a lubricant such as grease, or the roller may be formed of a solid lubricant.

In the present invention, circumferential orbits A and C, and B and D are used as non-circular grooves; however, only orbits A and C (only the first cam member 209a) or only orbits B and D (only the second cam member 209b) may be used. In this case, for constant stable rolling of the rollers along the first and second cam members, the first and second cam members or the rollers may be formed of magnets.

As has been described above, according to the present invention, since the cam mechanism is employed to convert uniform rotational movement to non uniform speed rotational movement, the degree of freedom of design is enhanced. Specifically, the disadvantage in which only the intermittent rotation curve corresponding to a cycloid curve can be designed by use of the epicyclic gear mechanism is eliminated. According to the method of this invention, since the con-rod in mechanism of FIG. 2 is not used, no difference occurs between the absolute values of the rotational acceleration of the feed rotor, and noise and vibration can be prevented. Since no gears are used, there is no wear of gear surfaces, and the life of the apparatus can be increased.

Furthermore, since various cam mechanisms are used, the rotation mode of the feed rotor can be selected, and the operation matching the condition of sheets to be fed can be performed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for feeding a sheet-like object, comprising:
   driving means;
   a fly-wheel rotated by the driving means at a uniform speed;
   a rotor for displacing the sheet-like object by a torque of the rotor in the direction of the torque; and
   a cam mechanism for converting the uniform speed rotational movement of the fly-wheel to non-uniform speed rotational movement, and transmitting the non-uniform speed rotational movement to the rotor,
   wherein said cam mechanism comprises:
   a stationary cam member;
   an orbit forming member formed on the cam member;
   a roller urged by uniform speed rotational movement of the fly-wheel to move along the orbit forming member; and
   a transmission mechanism for transmitting to the rotor non-uniform speed rotational movement obtained as a result of the movement of the roller along the orbit forming member.

2. The apparatus according to claim 1, wherein the distance between the rotational center of the arm member and the rotational center of the roller is substantially equal to the distance between the rotational center of the arm member and said engaging portion of the crank member.

3. The apparatus according to claim 1, wherein said orbit forming member is a non-circular groove formed in said cam member.

4. The apparatus according to claim 3, wherein said non-circular groove includes a curve which equalizes the absolute value of a maximum acceleration of the rotor to the absolute value of a minimum acceleration of the rotor.

5. The apparatus according to claim 3, wherein said non-circular groove includes such a curve that a maximum stop time of the rotor is obtained in the case where the time required for a single rotation of the rotor is constant.

6. The apparatus according to claim 1, wherein said transmission mechanism comprises:
   an arm member penetrating said fly-wheel, extending in parallel to a center shaft of the fly-wheel, and having one end portion supporting the roller rotatably; and
   a crank member for exerting a rotational force to the roller, said crank member having one end portion engaged with the other end portion of the arm member and the other end portion fixed to a center part of the roller.

7. The apparatus according to claim 6, wherein a coupling member for canceling a load imbalance is provided at an engaging portion between said one end portion of the crank member and the other end portion of the arm member.

8. The apparatus according to claim 6, wherein said arm member has a reinforcing portion at a part which penetrates the fly-wheel.

9. The apparatus according to claim 1, wherein said orbit forming member is a plurality of non-circular grooves associated with different non-uniform rotational movements.

10. The apparatus according to claim 1,
    including a switching mechanism for moving the transmission mechanism and the cam member relative to the orbit forming members, thereby switching the non-uniform speed rotational movement which corresponds to the orbit forming members and is to be transmitted to the transmission mechanism.

11. The apparatus according to claim 10, wherein said switching mechanism includes a mechanism for manually moving the cam member relative to the roller.

12. The apparatus according to claim 10, wherein said orbit forming member is a non-circular groove formed in said cam member.

13. The apparatus according to claim 12, wherein said non-circular groove includes a curve which equalizes the absolute value of a maximum acceleration of the rotor to the absolute value of a minimum acceleration of the rotor.

14. The apparatus according to claim 12, wherein said non-circular groove includes such a curve that a maximum stop time of the rotor is obtained in the case where the time required for a single rotation of the rotor is constant.

15. The apparatus according to claim 11, wherein said switching mechanism includes a screw mechanism for moving the cam member relative to the roller.

16. The apparatus according to claim 15, wherein said switching mechanism includes a mechanism for manually moving the cam member relative to the roller.

* * * * *